(12) United States Patent
Bakshi et al.

(10) Patent No.: US 12,346,966 B2
(45) Date of Patent: Jul. 1, 2025

(54) SYSTEM AND METHOD FOR TRANSACTION RECONCILIATION AND ANOMALY DETECTION USING TOKENIZED DECENTRALIZED MESH

(71) Applicant: Bank of America Corporation, Charlotte, NC (US)

(72) Inventors: Sakshi Bakshi, New Delhi (IN); Sharat Chandran, Hyderabad (IN); Arif Ahmad Khan, New Delhi (IN); Durga Prasad Kutthumolu, Telangana (IN); Kapil Juneja, Rajasthan (IN); Arvind Bansal, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 247 days.

(21) Appl. No.: 18/144,338

(22) Filed: May 8, 2023

(65) Prior Publication Data
US 2024/0378668 A1  Nov. 14, 2024

(51) Int. Cl.
*G06Q 40/04* (2012.01)

(52) U.S. Cl.
CPC ......... *G06Q 40/04* (2013.01); *G06Q 2220/00* (2013.01)

(58) Field of Classification Search
CPC ............................ G06Q 2220/00; G06Q 40/04
See application file for complete search history.

(56) References Cited

U.S. PATENT DOCUMENTS

| | | | |
|---|---|---|---|
| 9,049,010 B2 | 6/2015 | Jueneman et al. | |
| 9,116,849 B2 | 8/2015 | Nayshtut et al. | |
| 9,722,977 B2 | 8/2017 | Hars | |
| 9,853,977 B1 * | 12/2017 | Laucius | H04L 63/0884 |
| 10,402,571 B2 | 9/2019 | Nayshtut et al. | |
| 11,132,338 B1 | 9/2021 | Zhang et al. | |
| 11,909,860 B1 * | 2/2024 | So | G06Q 40/06 |
| 12,141,871 B1 * | 11/2024 | James | G06Q 20/065 |
| 2011/0218900 A1 * | 9/2011 | Cheung | G06Q 40/04 705/37 |
| 2019/0163666 A1 * | 5/2019 | Cakmak | G06N 5/02 |
| 2021/0174319 A1 * | 6/2021 | Kellman | G06Q 20/326 |
| 2021/0344656 A1 | 11/2021 | Basin | |

(Continued)

Primary Examiner — Mohamed A. Wasel
(74) Attorney, Agent, or Firm — Banner & Witcoff, Ltd.

(57) ABSTRACT

Aspects of the disclosure relate to a dual-system reconciliation process of trades. A first real-time trade processing and centralized reconciliation engine may continuously process trades in real-time and may perform centralized reconciliation of the trades. An anomaly detection and reconciliation mesh analysis engine may tokenize trade metadata received from the first real-time trade processing and centralized reconciliation engine, generate tokenized trade digital DNA, generate hashed tokenized trade digital DNA, evaluate and validate the hashed data, and perform decentralized reconciliation mesh analysis of the hashed data using a reconciliation mesh. The anomaly detection and reconciliation mesh analysis engine may send one or more monitory policies from the reconciliation mesh to a user device and may receive a first monitory policy selection from the user device. The anomaly detection and reconciliation mesh analysis engine may update the decentralized reconciliation mesh based on the first monitory policy selection.

20 Claims, 16 Drawing Sheets

(56) References Cited

U.S. PATENT DOCUMENTS

| | | | |
|---|---|---|---|
| 2022/0114580 A1* | 4/2022 | Gopireddy | G06Q 20/381 |
| 2022/0255969 A1* | 8/2022 | Cage | H04L 9/50 |
| 2022/0391892 A1* | 12/2022 | Wied | G06F 16/2308 |
| 2023/0195715 A1* | 6/2023 | Schleith | G06F 16/215 707/691 |
| 2023/0196370 A1* | 6/2023 | Levine | G06Q 20/389 |

* cited by examiner

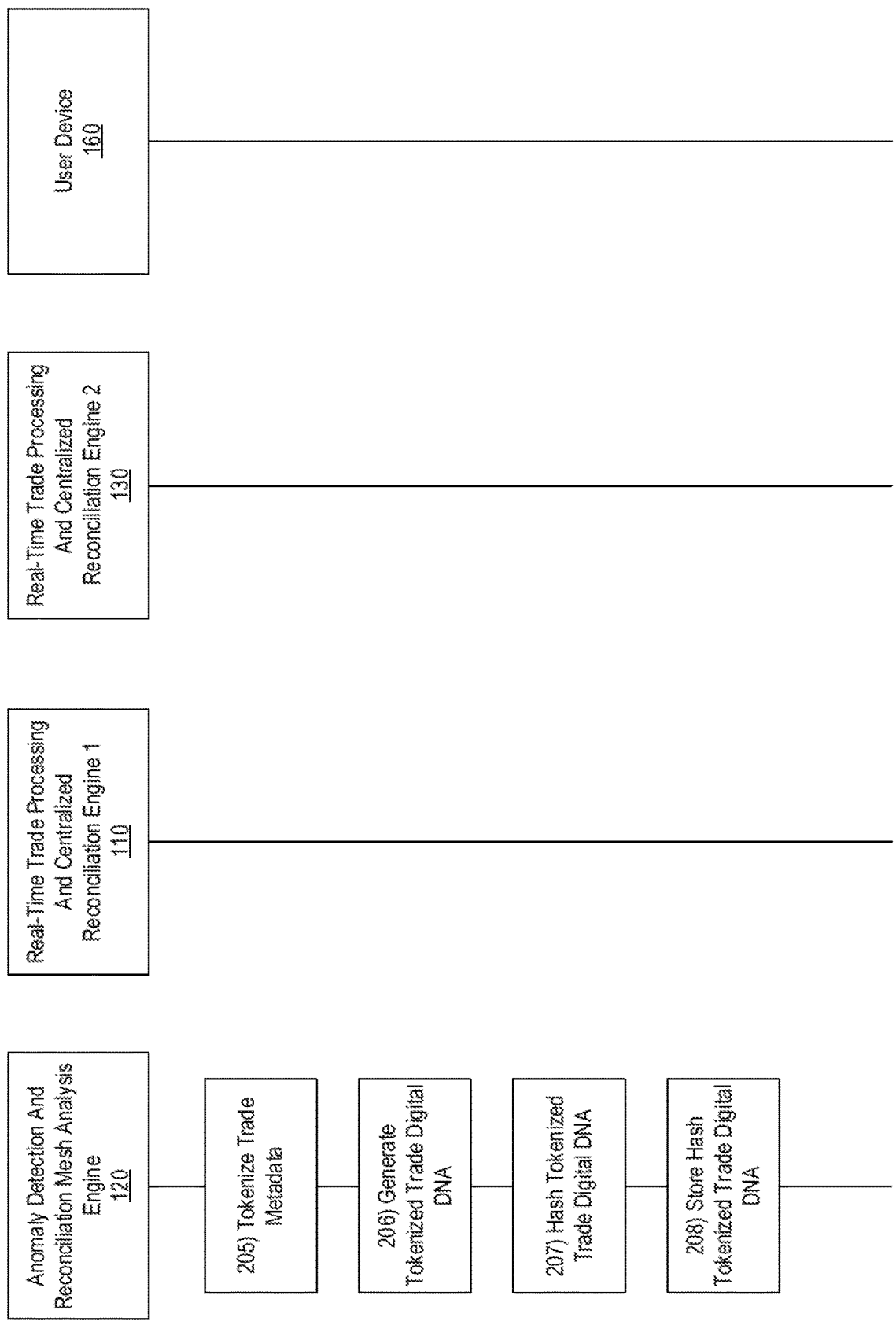

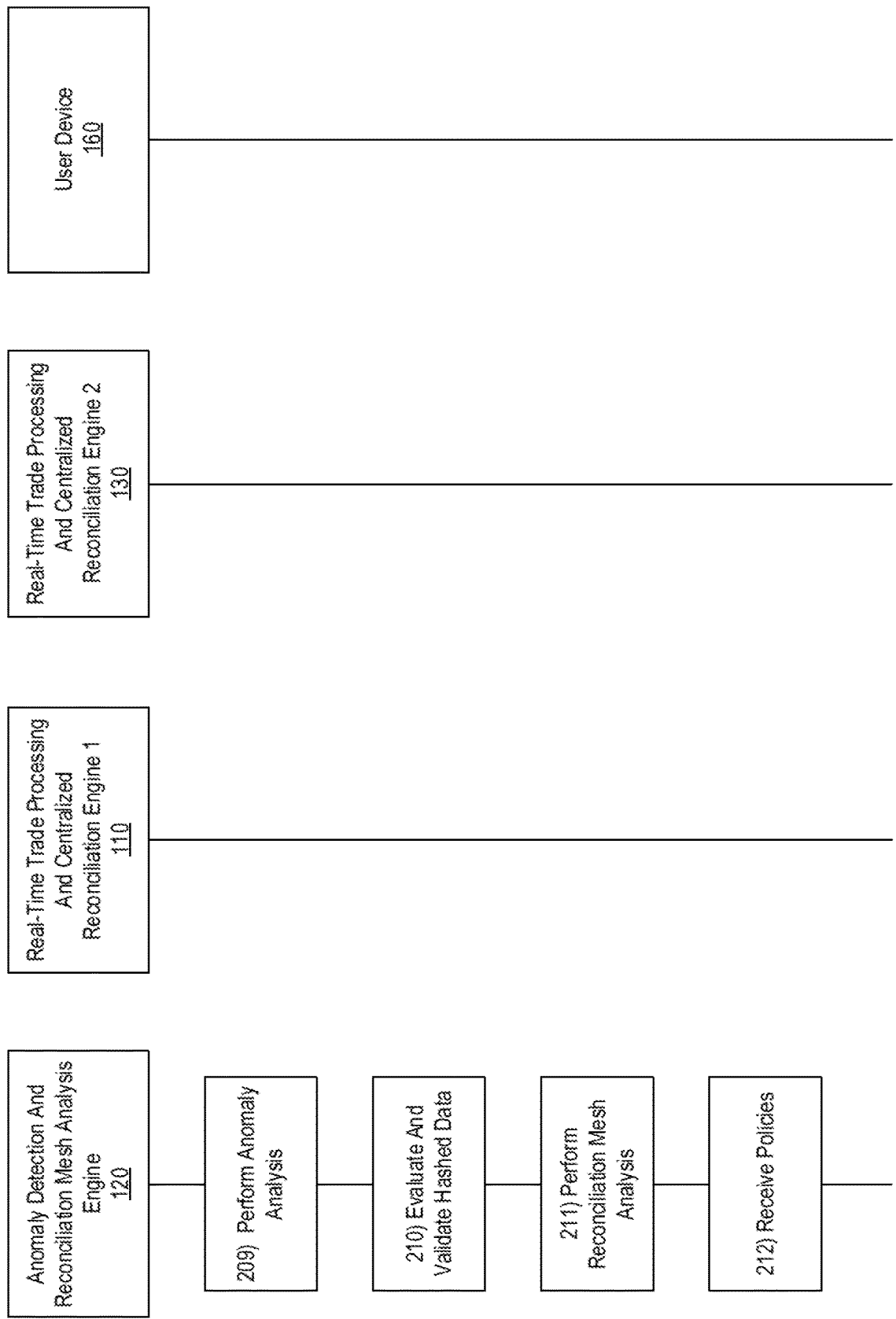

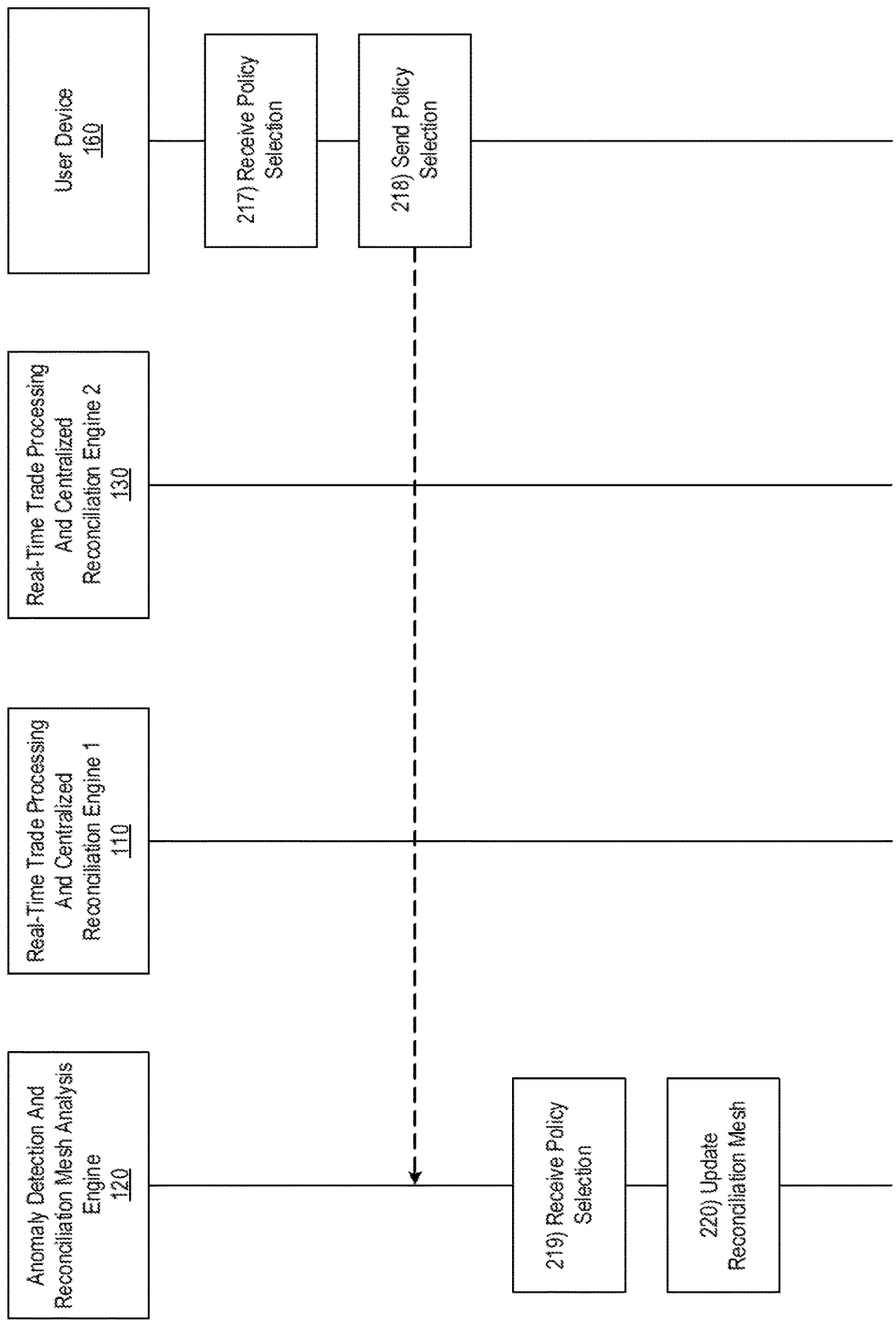

350

Anomaly Analysis Request

360

Please Select Trade Metadata for Analysis

File 1

File 2

•
•
•

File N

370

Please Enter Regulatory and/or Policy Variances

File 1

File 2

•
•
•

File N

SYSTEM AND METHOD FOR TRANSACTION RECONCILIATION AND ANOMALY DETECTION USING TOKENIZED DECENTRALIZED MESH

BACKGROUND

Aspects of the disclosure relate to real-time dual system reconciliation of a plurality of trades from a plurality of trade systems. In particular, one or more aspects of the disclosure relate to a computing system that dynamically performs centralized reconciliations of trades at a plurality of real-time trade processing and centralized reconciliation engines, in real-time, based on trade metadata and a decentralized reconciliation of trades at an anomaly detection and reconciliation mesh analysis engine based on a system-generated hashed tokenized trade digital DNA.

Enterprise organizations commonly use different computing systems to process trades made across various trading platforms. A plurality of computing systems may each process the same trade, resulting in conflicting trade metadata. This conflicting trade metadata often leads to inefficiencies in downstream systems, where processing errors resulting from the use of the conflicting trade metadata require lengthy and often ineffective manual intervention. As a result, enterprise organizations are unable to meet national and international regulatory reporting requirements for large batches of trade metadata.

SUMMARY

Aspects of the disclosure provide effective, efficient, scalable, and convenient technical solutions that address and overcome the technical problems associated with the processing of trade metadata by different computing systems by implementing a dual-system reconciliation process that includes first real-time centralized reconciliations of trade metadata at a plurality of real-time trade processing and centralized reconciliation engines and second decentralized reconciliations of trade metadata at an anomaly detection and reconciliation mesh analysis engine based on system-generated hashed tokenized trade digital DNA. In accordance with one or more embodiments of the disclosure, a computing system may include a real-time trade processing and centralized reconciliation engine comprising at least a first processor, a first communication interface, and a first memory storing computer-readable instructions that, when executed by the real-time trade processing and centralized reconciliation engine, may cause the real-time trade processing and centralized reconciliation engine to process a first trade by retrieving first trade metadata associated with the first trade from a first trade system associated with the first trade. The real-time trade processing and centralized reconciliation engine may determine whether there are any anomalies in the first trade metadata by performing a centralized reconciliation on the first trade metadata using historical trade data of the first trade system associated with the first trade and an anomaly history of the first trade system associated with the first trade. Responsive to determining that there are no anomalies in the first trade metadata, the real-time trade processing and centralized reconciliation engine may send the first trade metadata to an anomaly detection and reconciliation mesh analysis engine.

The anomaly detection and reconciliation mesh analysis engine may also be a part of the computing system, and may comprise at least a second processor, a second communication interface, and second memory storing computer-readable instructions that, when executed by the at least second processor, causes the anomaly detection and reconciliation mesh analysis engine to receive the first trade metadata from the real-time trade processing and centralized reconciliation engine. The anomaly detection and reconciliation mesh analysis engine may tokenize the first trade metadata to generate first tokenized trade metadata. The anomaly detection and reconciliation mesh analysis engine may generate, from at least the first tokenized trade metadata, first tokenized trade digital DNA. The anomaly detection and reconciliation mesh analysis engine may then perform hashing on the first tokenized trade digital DNA to generate hashed data. The anomaly detection and reconciliation mesh analysis engine may compare the hashed data to determine whether there are any anomalies within the hashed data. Responsive to determining that the hashed data comprises at least one anomaly, the anomaly detection and reconciliation mesh analysis engine may input the hashed data into a decentralized reconciliation mesh.

In one or more instances, the first trade may further be associated with a second trade system. In one or more instances, the centralized reconciliation may further use historical trade data of the second trade system associated with the first trade and an anomaly history of the second trade system associated with the first trade.

The computing system may include a second real-time trade processing and centralized reconciliation engine comprising at least a third processor, a third communication interface, and third memory storing computer-readable instructions that, when executed by the at least third processor, causes the second real-time trade processing and centralized reconciliation engine to process a second trade by retrieving second trade metadata associated with the second trade. The second real-time trade processing and centralized reconciliation engine may determine whether there are any anomalies in the second trade metadata by performing a centralized reconciliation on the second trade metadata. Responsive to determining that there are no anomalies in the second trade metadata, the second real-time trade processing and centralized reconciliation engine may send the second trade metadata to the anomaly detection and reconciliation mesh analysis engine.

In one or more instances, the anomaly detection and reconciliation mesh analysis engine may receive the second trade metadata from the second real-time trade processing and centralized reconciliation engine and tokenize the second trade metadata to generate second tokenized trade metadata. In one or more instances, the first tokenized trade digital DNA may further be generated based on the second tokenized trade metadata that is associated with the second trade. In one or more instances, the first trade may be the same as the second trade, the first tokenized trade metadata and the second tokenized trade metadata may be part of a first strand of digital data within the first tokenized trade digital DNA, and the first strand of digital data within the first tokenized trade digital DNA may be generated by algorithmically combining the first tokenized trade metadata, the second tokenized trade metadata, and one or more markers associated with the first trade system.

In some instances, performing the hashing on the first tokenized trade digital DNA may comprise hashing the first strand of digital data. In some instances, performing the hashing on the first tokenized trade digital DNA may comprise hashing the first tokenized trade metadata and the second tokenized trade metadata. In some instances, the real-time trade processing and centralized reconciliation engine may process the first trade in real-time.

In accordance with one or more embodiments, a method is provided at a real-time trade processing and centralized reconciliation engine comprising at least a first processor, a first communication interface, and first memory. The method may include processing a first trade by retrieving first trade metadata associated with the first trade from a first trade system associated with the first trade and determining whether there are any anomalies in the first trade metadata by performing a centralized reconciliation on the first trade metadata using historical trade data of the first trade system associated with the first trade and an anomaly history of the first trade system associated with the first trade. In response to determining there are no anomalies in the first trade metadata, the method may include, at the anomaly detection and reconciliation mesh analysis engine comprising at least a second processor, a second communication interface, and a second memory, receiving the first trade metadata from the real-time trade processing and centralized reconciliation engine, tokenizing the first trade metadata to generate first tokenized trade metadata, and generating, from at least the first tokenized trade metadata, first tokenized trade digital DNA. Thereafter, the method may include performing hashing on the first tokenized trade digital DNA to generate hashed data and comparing the hashed data to determine whether there are any anomalies within the hashed data. Responsive to determining that the hashed data comprises at least one anomaly, the method may then include inputting the hashed data into a decentralized reconciliation mesh.

In one or more instances, the first trade may further be associated with a second trade system. In one or more instances, the centralized reconciliation may further use historical trade data of the second trade system associated with the first trade and an anomaly history of the second trade system associated with the first trade.

In one or more instances, the method may further be provided at a second real-time trade processing and centralized reconciliation engine comprising at least a third processor, a third communication interface, and a third memory, and may include the second real-time trade processing and centralized reconciliation engine processing a second trade by retrieving second trade metadata associated with the second trade, determining whether there are any anomalies in the second trade metadata by performing a centralized reconciliation on the second trade metadata, and responsive to determining that there are no anomalies in the second trade metadata, sending the second trade metadata to the anomaly detection and reconciliation mesh analysis engine.

In one or more instances, the method may include the anomaly detection and reconciliation mesh analysis engine receiving the second trade metadata from the second real-time trade processing and centralized reconciliation engine and tokenizing the second trade metadata to generate second tokenized trade metadata. In one or more instances, the first tokenized trade digital DNA may further be generated based on the second tokenized trade metadata that is associated with the second trade. In one or more instances, the first trade may be the same as the second trade, the first tokenized trade metadata and the second tokenized trade metadata may be part of a first strand of digital data within the first tokenized trade digital DNA, and the first strand of digital data within the first tokenized trade digital DNA may be generated by algorithmically combining the first tokenized trade metadata, the second tokenized trade metadata, and one or more markers associated with the first trade system.

In some instances, performing the hashing on the first tokenized trade digital DNA may comprise hashing the first strand of digital data. In some instances, performing the hashing on the first tokenized trade digital DNA may comprise hashing the first tokenized trade metadata and the second tokenized trade metadata. In some instances, the real-time trade processing and centralized reconciliation engine may process the first trade in real-time.

In accordance with one or more embodiments, a plurality of non-transitory computer-readable media may be provided, and may include a first non-transitory computer-readable media storing instructions that, when executed by a real-time trade processing and centralized reconciliation engine comprising at least a first processor, a first communication interface, and first memory, may cause the real-time trade processing and centralized reconciliation engine to process a first trade by retrieving first trade metadata associated with the first trade from a first trade system associated with the first trade, determine whether there are any anomalies in the first trade metadata by performing a centralized reconciliation on the first trade metadata using historical trade data of the first trade system associated with the first trade and an anomaly history of the first trade system associated with the first trade, and responsive to determining that there are no anomalies in the first trade metadata, send the first trade metadata to an anomaly detection and reconciliation mesh analysis engine. The plurality of non-transitory computer-readable media may include second non-transitory computer-readable media storing instructions that, when executed by the anomaly detection and reconciliation mesh analysis engine comprising at least a second processor, a second communication interface, and a second memory, cause the anomaly detection and reconciliation mesh analysis engine to receive the first trade metadata from the real-time trade processing and centralized reconciliation engine, tokenize the first trade metadata to generate first tokenized trade metadata, generate, from at least the first tokenized trade metadata, first tokenized trade digital DNA, perform hashing on the first tokenized trade digital DNA to generate hashed data, compare the hashed data to determine whether there are any anomalies within the hashed data, and responsive to determining that the hashed data comprises at least one anomaly, input the hashed data into a decentralized reconciliation mesh.

In accordance with one or more embodiments of the disclosure, an anomaly detection and reconciliation mesh analysis engine may comprise at least one processor, a communication interface, and memory storing computer-readable instructions that, when executed by the at least one processor, may cause the anomaly detection and reconciliation mesh analysis engine to receive a request for a user interface from a user device, generate a first user interface in response to receiving the request, and send the first user interface to the user device, wherein the sending the first user interface to the user device causes the user device to output the first user interface for display on a display device associated with the user device. The anomaly detection and reconciliation mesh analysis engine may receive, from the user device, one or more anomaly analysis configuration parameters, wherein the one or more anomaly analysis configuration parameters comprise at least trade metadata. The anomaly detection and reconciliation mesh analysis engine may generate first tokenized trade metadata for a first trade metadata of the trade metadata and second tokenized trade metadata for a second trade metadata of the trade metadata. The anomaly detection and reconciliation mesh analysis engine may generate, using the first tokenized trade metadata and the second tokenized trade metadata, tokenized trade digital DNA. The anomaly detection and reconciliation mesh analysis engine may generate hashed data by hashing a first strand of the tokenized trade digital DNA that comprises the first tokenized trade metadata and the second tokenized trade metadata. The anomaly detection and reconciliation mesh analysis engine may determine whether there are any anomalies in the hashed data by comparing the hashed data. The anomaly detection and reconciliation mesh analysis engine may then perform decentralized reconciliation mesh analysis on the hashed data by inputting the hashed data into a decentralized reconciliation mesh.

In some instances, the one or more anomaly analysis configuration parameters may further comprise a variance on a first monitory policy associated with the trade metadata. In some instances, performing the decentralized reconciliation mesh analysis may further comprise inputting the variance into the decentralized reconciliation mesh.

In some instances, the anomaly detection and reconciliation mesh analysis engine may receive, from the decentralized reconciliation mesh, a plurality of monitory policies. In one or more instances, the anomaly detection and reconciliation mesh analysis engine may generate a second user interface, the second user interface comprising at least the plurality of monitory policies and a first anomaly associated with the hashed data and send the second user interface to the user device, wherein the sending the second user interface to the user device causes the user device to output the second user interface for display on a display device associated with the user device. In some instances, the anomaly detection and reconciliation mesh analysis engine may receive, from the user device, a selection of a first monitory policy from the plurality of monitory policies. In some instances, the anomaly detection and reconciliation mesh analysis engine may update the decentralized reconciliation mesh using the first monitory policy.

In some instances, hashing the first strand of the tokenized trade digital DNA may comprise applying a hashing algorithm to the first strand. In some instances, hashing the first strand of the tokenized trade digital DNA may comprise applying a hashing algorithm to the first tokenized trade metadata and the second tokenized trade metadata.

In accordance with one or more embodiments of the disclosure, a method is provided at an anomaly detection and reconciliation mesh analysis engine comprising at least one processor, a communication interface, and memory. The method may include receiving a request for a user interface from a user device, generating a first user interface in response to receiving the request, and sending the first user interface to the user device, wherein the sending the first user interface to the user device may cause the user device to output the first user interface for display on a display device associated with the user device. The method may include receiving, from the user device, one or more anomaly analysis configuration parameters, wherein the one or more anomaly analysis configuration parameters comprise at least trade metadata. The method may include generating first tokenized trade metadata for a first trade metadata of the trade metadata and second tokenized trade metadata for a second trade metadata of the trade metadata. The method may include generating, using the first tokenized trade metadata and the second tokenized trade metadata, tokenized trade digital DNA. The method may include generating hashed data by hashing a first strand of the tokenized trade digital DNA that comprises the first tokenized trade metadata and the second tokenized trade metadata. The method may include determining whether there are any anomalies in the hashed data by comparing the hashed data. The method may include performing decentralized reconciliation mesh analysis on the hashed data by inputting the hashed data into a decentralized reconciliation mesh.

In some instances, the one or more anomaly analysis configuration parameters may further comprise a variance on a first monitory policy associated with the trade metadata. In some instances, performing the decentralized reconciliation mesh analysis may further include inputting the variance into the decentralized reconciliation mesh.

In some instances, the method may include receiving, from the decentralized reconciliation mesh, a plurality of monitory policies. In one or more instances, the method may include generating a second user interface, the second user interface comprising at least the plurality of monitory policies and a first anomaly associated with the hashed data and sending the second user interface to the user device, wherein the sending the second user interface to the user device may cause the user device to output the second user interface for display on a display device associated with the user device. In some instances, the method may include receiving, from the user device, a selection of a first monitory policy from the plurality of monitory policies. In some instances, the method may include updating the decentralized reconciliation mesh using the first monitory policy.

In some instances, hashing the first strand of the tokenized trade digital DNA may comprise applying a hashing algorithm to the first tokenized trade metadata and the second tokenized trade metadata. In some instances, comparing the hashed data may comprise comparing the hashed first tokenized trade metadata and the hashed second tokenized trade metadata.

In accordance with one or more embodiments, one or more non-transitory computer-readable media may store instructions that, when executed by an anomaly detection and reconciliation mesh analysis engine comprising at least one processor, a communication interface, and memory, cause the anomaly detection and reconciliation mesh analysis engine to receive a request for a user interface from a user device, generate a first user interface in response to receiving the request, send the first user interface to the user device, wherein the sending the first user interface to the user device may cause the user device to output the first user interface for display on a display device associated with the user device, receive, from the user device, one or more anomaly analysis configuration parameters, wherein the one or more anomaly analysis configuration parameters comprise at least trade metadata, generate first tokenized trade metadata for a first trade metadata of the trade metadata, generate second tokenized trade metadata for a second trade metadata of the trade metadata, generate, using the first tokenized trade metadata and the second tokenized trade metadata, tokenized trade digital DNA, generate hashed data by hashing a first strand of the tokenized trade digital DNA that comprises the first tokenized trade metadata and the second tokenized trade metadata, determine whether there are any anomalies in the hashed data by comparing the hashed data, and perform decentralized reconciliation mesh analysis on the hashed data by inputting the hashed data into a decentralized reconciliation mesh.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2J depict an illustrative event sequence for a computing system comprising a plurality of real-time trade processing and centralized reconciliation engines and an anomaly detection and reconciliation mesh analysis engine that collectively implement a dual-system trade reconciliation process in accordance with one or more example embodiments;

FIGS. 3A-3B depict illustrative graphical user interfaces that implement a computing system comprising a plurality of real-time trade processing and centralized reconciliation engines and an anomaly detection and reconciliation mesh analysis engine that collectively implement a dual-system trade reconciliation process in accordance with one or more example embodiments.

DETAILED DESCRIPTION

Figure 1A:
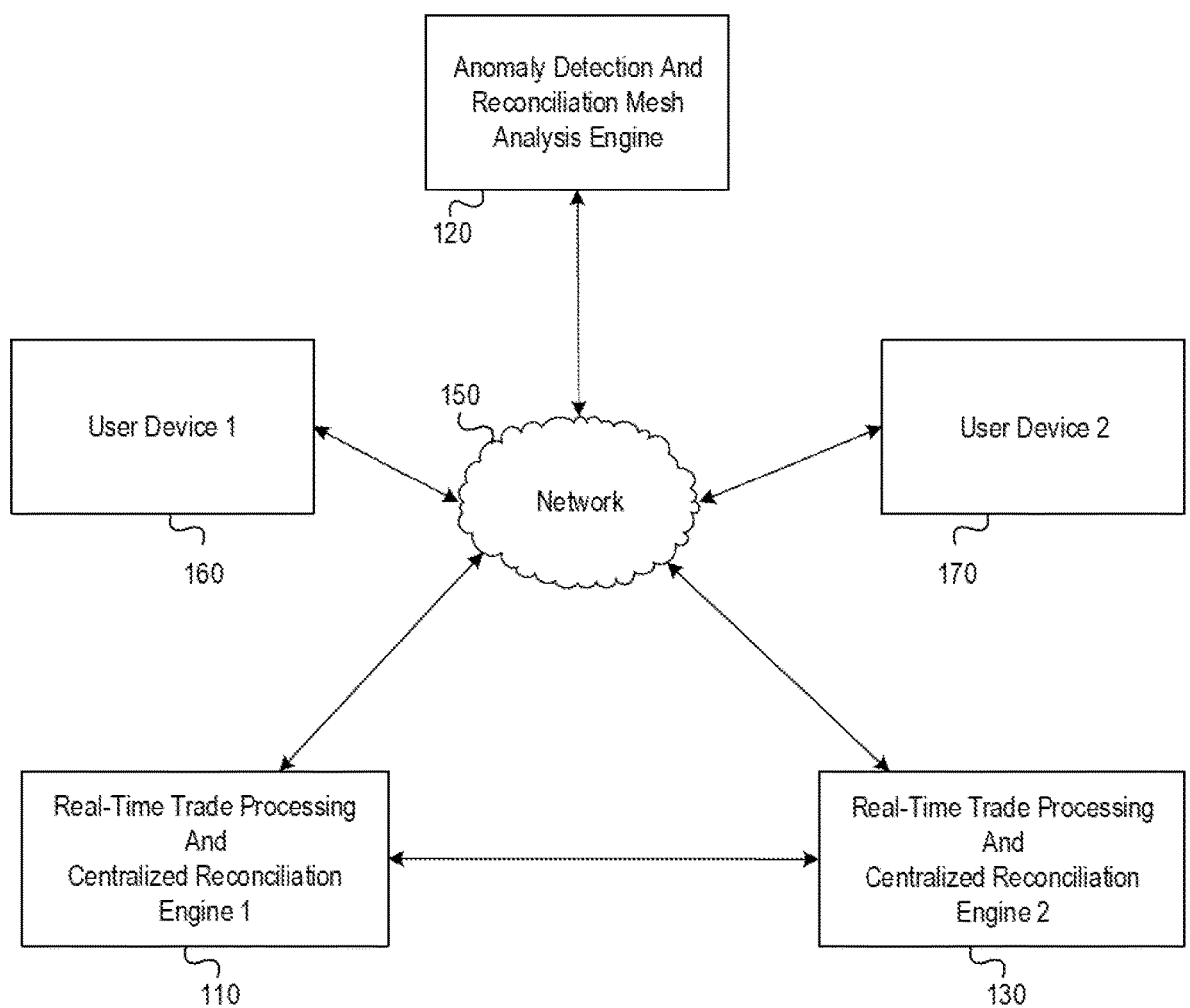
FIGS. 1A-1C depict an illustrative computing environment for a plurality of real-time trade processing and centralized reconciliation engines and an anomaly detection and reconciliation mesh analysis engine that collectively implement a dual-system trade reconciliation process in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for implementing a dual-system reconciliation process that includes first real-time centralized reconciliations of trade metadata at a plurality of real-time trade processing and centralized reconciliation engines and second decentralized reconciliations of trade metadata at an anomaly detection and reconciliation mesh analysis engine based on system-generated hashed tokenized trade digital DNA. While the use of multiple trading platforms for executing trades offers numerous benefits, it also results in the generation of improperly conflicting trade metadata, thereby rendering it impossible for enterprise organizations to comply with international and national regulatory reporting requirements without lengthy and ineffective manual intervention.

In order to solve for the above-noted shortcomings, a computing system that dynamically performs first centralized reconciliations of trades at a plurality of real-time trade processing and centralized reconciliation engines in real-time based on trade metadata and second decentralized reconciliations of trades at an anomaly detection and reconciliation mesh analysis engine based on system-generated hashed tokenized trade digital DNA may be implemented. Specifically, systems, methods, and apparatuses described herein may provide an interconnected and cross-functional anomaly detection and reconciliation mesh analysis engine and plurality of real-time trade processing and centralized reconciliation engines.

The computing system may include a plurality of real-time trade processing and centralized reconciliation engines and an anomaly detection and reconciliation mesh analysis engine. Each real-time trade processing and centralized reconciliation engine may include a system architecture including one or more of the following: a data interface module, a centralized reconciliation engine, and a policies repository. The anomaly detection and reconciliation mesh analysis engine may include a system architecture including a data interface module, a metadata tokenization and digital DNA token generation module, a hash-based anomaly detection module, a suspicious activity validation and evaluation module, an AI-based reconciliation mesh training and execution module, and a dynamic API module. The real-time trade processing and centralized reconciliation engines and anomaly detection and reconciliation mesh analysis engine may be employed in a computing environment comprising multiple trading systems, which may be external to the real-time trade processing and centralized reconciliation engines or embedded within the real-time trade processing and centralized reconciliation engines. Various enterprise organizations may execute a plurality of trades across a plurality of trading platforms. The computing systems maintained by an enterprise organization (such as the real-time trade processing and centralized reconciliation engines) may be downstream computing engines that process one or more trades executed on the trade systems by retrieving trade metadata associated with the trades. In order to efficiently and optimally reconcile all of the trade metadata retrieved by its computing engines, an enterprise organization may implement a dual-layer reconciliation system. Each of the real-time trade processing and centralized reconciliation engines may perform real-time centralized reconciliations for the trade metadata retrieved by those real-time trade processing and centralized reconciliation engines using the centralized reconciliation engine integrated into the real-time trade processing and centralized reconciliation engines. The anomaly detection and reconciliation mesh analysis engine may subsequently perform decentralized reconciliations of all of the trade metadata received by the anomaly detection and reconciliation mesh analysis engine from the plurality of real-time trade processing and centralized reconciliation engines using a decentralized reconciliation mesh.

Figure 1B:
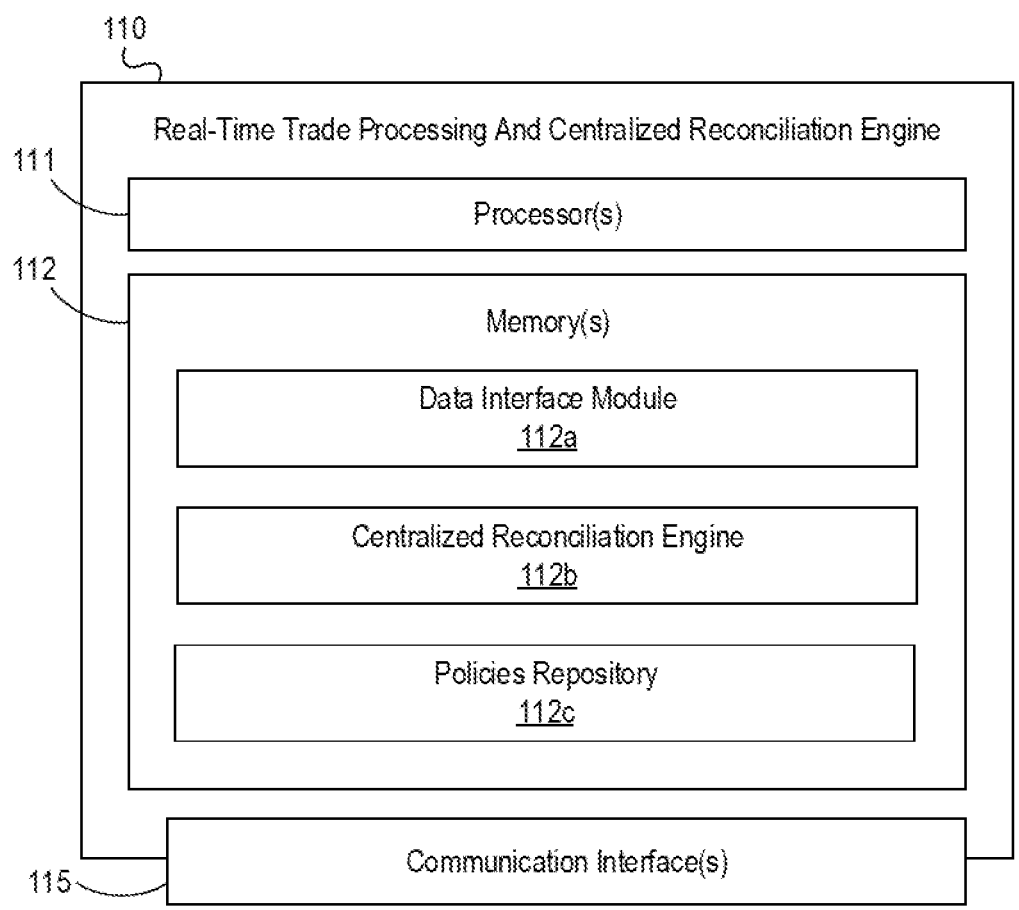
Figure 1C:
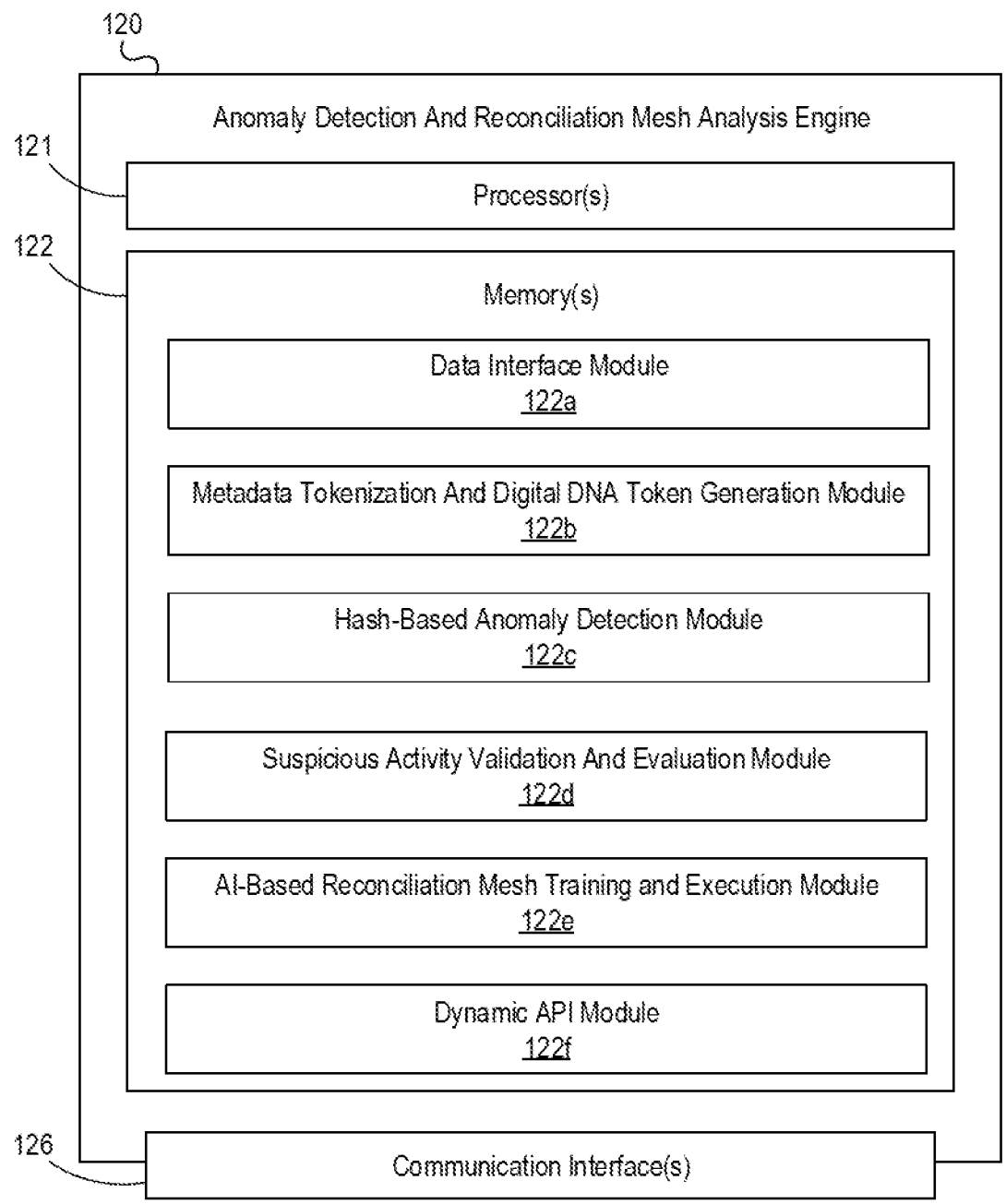

FIGS. 1A-1C depict an illustrative computing environment including a plurality of real-time trade processing and centralized reconciliation engines and an anomaly detection and reconciliation mesh analysis engine that collectively implement a dual-system trade reconciliation process in accordance with one or more example embodiments. FIG. 1A depicts an illustrative computing environment that implements a plurality of real-time trade processing and centralized reconciliation engines and an anomaly detection and reconciliation mesh analysis engine that collectively implement a dual-system trade reconciliation process with one or more example embodiments. Referring to FIG. 1A, computing environment 100 may include a network 150 that interconnects various computing engines and devices within the computing environment 150. Computing environment may include multiple real-time trade processing and centralized reconciliation engines, such as real-time trade processing and centralized reconciliation engine 110 and real-time trade processing and centralized reconciliation engine 130. While only two real-time trade processing and centralized reconciliation engines are shown for purposes of brevity, it is understood that computing environment 100 may include any number of real-time trade processing and centralized reconciliation engines. Real-time trade processing and centralized reconciliation engine 110 and real-time trade processing and centralized reconciliation engine 130 may be similar in structure and functionality. Real-time trade processing and centralized reconciliation engine 110 and real-time trade processing and centralized reconciliation engine 130 may each be connected to one or more networks, such as network 150, and may further communicate directly with each other. Computing environment 100 may further include anomaly detection and reconciliation mesh analysis engine 120, which may be connected to real-time trade processing and centralized reconciliation engine 110 and real-time trade processing and centralized reconciliation engine 130 via network 150. Finally, computing environment may include one or more user devices, such as user device 160 and user device 170, that may be connected to network 150. The one or more networks in computing environment 100 may interconnect one or more of anomaly detection and reconciliation mesh analysis engine 120, real-time trade processing and centralized reconciliation engine 110, real-time trade processing and centralized reconciliation engine 130, user device 160, and/or user device 170.

As described further below, each of anomaly detection and reconciliation mesh analysis engine 120, real-time trade processing and centralized reconciliation engine 110, and real-time trade processing and centralized reconciliation engine 130 may be a computer system that includes one or more computing devices (e.g., servers, server blades, or the like) and/or other computer components (e.g., processors, memories, communication interfaces) that may be used to receive and reconcile trade metadata. In some instances, one or more of anomaly detection and reconciliation mesh analysis engine 120, real-time trade processing and centralized reconciliation engine 110, and real-time trade processing and centralized reconciliation engine 130 may be controlled or otherwise maintained by an enterprise organization such as a financial institution.

Each of user device 160 and user device 170 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or trade metadata anomaly analysis. In one or more instances, these user devices may be configured to communicate with anomaly detection and reconciliation mesh analysis engine 120, real-time trade processing and centralized reconciliation engine 110, and/or real-time trade processing and centralized reconciliation engine 130 to retrieve trade data, request anomaly analysis of trade metadata, receive results of anomaly analysis of trade metadata, view monitory policies associated with trade metadata, and configure monitory policies associated with trade metadata.

Anomaly detection and reconciliation mesh analysis engine 120, real-time trade processing and centralized reconciliation engine 110, and real-time trade processing and centralized reconciliation engine 130 may include one or more modules therein. For example, each of real-time trade processing and centralized reconciliation engine 110 and real-time trade processing and centralized reconciliation engine 130 may include a data interface module, a centralized reconciliation engine, and a policies repository. Anomaly detection and reconciliation mesh analysis engine 120 may include a system architecture including a data interface module, a metadata tokenization and digital DNA token generation module, a hash-based anomaly detection module, a suspicious activity validation and evaluation module, an AI-based reconciliation mesh training and execution module, and a dynamic API module. Each of these modules may include memory and one or more processors for executing the functionality of these modules.

In one or more arrangements, anomaly detection and reconciliation mesh analysis engine 120, real-time trade processing and centralized reconciliation engine 110, real-time trade processing and centralized reconciliation engine 130, user device 160, and/or user device 170 may be any type of computing device capable of processing trades, retrieving trade metadata, generating data based on the trade metadata, performing anomaly analysis, and/or reconciling trade metadata, accordingly. For example, anomaly detection and reconciliation mesh analysis engine 120, real-time trade processing and centralized reconciliation engine 110, real-time trade processing and centralized reconciliation engine 130, user device 160, and/or user device 170 and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of anomaly detection and reconciliation mesh analysis engine 120, real-time trade processing and centralized reconciliation engine 110, real-time trade processing and centralized reconciliation engine 130, user device 160, and/or user device 170 may, in some instances, be special-purpose computing devices configured to perform specific functions.

Referring to FIG. 1B, real-time trade processing and centralized reconciliation engine 110 may include one or more processors 111, memory 112, and communication interface 113. A data bus may interconnect processor 111, memory 112, and communication interface 113. Communication interface 113 may be a network interface configured to support communication between real-time trade processing and centralized reconciliation engine 110 and one or more networks (e.g., network 150 or the like). Memory 112 may include one or more program modules having instructions that when executed by processor 111, cause real-time trade processing and centralized reconciliation engine 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time trade processing and centralized reconciliation engine 110 and/or by different computing devices that may form and/or otherwise make up real-time trade processing and centralized reconciliation engine 110. For example, memory 112 may have, host, store, and/or include a data interface module 112*a*, a centralized reconciliation engine 112*b*, and a policies repository 112*c*. Each of data interface module 112*a*, a centralized reconciliation engine 112*b*, and a policies repository 112*c* may include its own memory (similar to memory 112) and/or processor(s) (similar to processor 111) to perform the functionality of these modules are described herein. The architecture of real-time trade processing and centralized reconciliation engine 130 and the functionality of the architectural components of real-time trade processing and centralized reconciliation engine 130 may be similar to that of real-time trade processing and centralized reconciliation engine 110. Though not illustrated in FIG. 1B, real-time trade processing and centralized reconciliation engine 110 and/or real-time trade processing and centralized reconciliation engine 130 may include one or more embedded trade systems.

Data interface module 112a may have instructions that direct and/or cause real-time trade processing and centralized reconciliation engine 110 to, for instance, receive trade metadata from one or more trading systems, send trade metadata to anomaly detection and reconciliation mesh analysis engine 120, and/or send trade metadata to centralized reconciliation engine 112b. Centralized reconciliation engine 112b may receive trade metadata from the data interface module 112a. Centralized reconciliation engine 112b may perform a centralized reconciliation for each of the trades that is processed by real-time trade processing and centralized reconciliation engine 110. Centralized reconciliation engine 112b may first verify that it has received all of the required trade metadata for a trade from the originating trade system. Once real-time trade processing and centralized reconciliation engine 110 has received all of the required trade metadata for a trade, centralized reconciliation engine 112b may further analyze the trade metadata to determine whether there is an anomaly within the trade metadata by processing the contents of the trade metadata itself, along with the trade history of the originating trade system associated with the trade and the anomaly history of the originating trade system associated with the trade. If the trade is a cross-trade (e.g., associated with multiple trade systems), centralized reconciliation engine 112b may analyze the trade history of each trade system associated with the trade and the anomaly history of each trade system associated with the trade. This real-time centralized reconciliation by centralized reconciliation engine 112b of the processed trades serves to eliminate basic discrepancies of the various trades that may be processed by real-time trade processing and centralized reconciliation engine 110. Policies repository 112c may store one or more monitory policies that govern the trades to be processed by real-time trade processing and centralized reconciliation engine 110. Policies repository 112c may be updated with new or modified monitory policies by anomaly detection and reconciliation mesh analysis engine 120.

Referring to FIG. 1C, anomaly detection and reconciliation mesh analysis engine 120 may include one or more processors 121, memory 122, and communication interface 123. A data bus may interconnect processor 121, memory 122, and communication interface 123. Communication interface 123 may be a network interface configured to support communication between anomaly detection and reconciliation mesh analysis engine 120 and one or more networks (e.g., network 150 or the like). Memory 122 may include one or more program modules having instructions that when executed by processor 121 cause anomaly detection and reconciliation mesh analysis engine 120 to perform one or more functions described herein and/or one or more databases that may store and/or otherwise maintain information which may be used by such program modules and/or processor 121. In some instances, the one or more program modules and/or databases may be stored by and/or maintained in different memory units of anomaly detection and reconciliation mesh analysis engine 120 and/or by different computing devices that may form and/or otherwise make up anomaly detection and reconciliation mesh analysis engine 120. For example, memory 122 may have, host, store, and/or include a data interface module 122a, a metadata tokenization and digital DNA token generation module 122b, a hash-based anomaly detection module 122c, a suspicious activity validation and evaluation module 122d, an AI-based reconciliation mesh training and execution module 122e, and a dynamic API module 122f. Each of data interface module 122a, a metadata tokenization and digital DNA token generation module 122b, a hash-based anomaly detection module 122c, a suspicious activity validation and evaluation module 122d, an AI-based reconciliation mesh training and execution module 122e, and a dynamic API module 122f, may include its own memory (similar to memory 122) and/or processor(s) (similar to processor 121) to perform the functionality of these modules are described herein.

Data interface module 122a may receive trade metadata from a plurality of real-time trade processing and centralized reconciliation engines such as real-time trade processing and centralized reconciliation engine 110 and real-time trade processing and centralized reconciliation engine 130, and send monitory policies to a plurality of real-time trade processing and centralized reconciliation engines, such as real-time trade processing and centralized reconciliation engine 110 and real-time trade processing and centralized reconciliation engine 130. Metadata tokenization and digital DNA token generation module 122b may generate tokenized trade metadata from the trade metadata received by data interface module 122a from the real-time trade processing and centralized reconciliation engines, and may generate, based on the tokenized trade metadata, tokenized trade digital DNA. Hash-based anomaly detection module 122c may perform hashing on the tokenized trade digital DNA and compare the hashed data to detect any anomalies within the hashed data. Suspicious activity validation and evaluation module 122d may flag hashed data in which an anomaly is found as suspicious and then evaluate the flagged hashed data to confirm the anomaly. AI-based reconciliation mesh training and execution module 122e may comprise a decentralized reconciliation mesh that is used to perform decentralized reconciliation mesh analysis. AI-based reconciliation mesh training and execution module 122e may initially train the decentralized reconciliation mesh using trade metadata (in the form of original trade metadata received from real-time trade processing and centralized reconciliation engines such as real-time trade processing and centralized reconciliation engine 110 and real-time trade processing and centralized reconciliation engine 130, tokenized trade metadata generated by anomaly detection and reconciliation mesh analysis engine 120 based on the original trade metadata, tokenized trade metadata digital DNA and/or hashed tokenized trade metadata digital DNA) and monitory policies (in the form of various rules and regulations governing original trade metadata, tokenized trade metadata, tokenized trade metadata digital DNA, hashed tokenized trade metadata digital DNA, or any hashed data in which anomalies were previously detected). AI-based reconciliation mesh training and execution module 122e may continuously update the decentralized reconciliation mesh based on its inputs, outputs, and selected monitory policies received from user devices such as user device 160 and/or user device 170. Dynamic API module 122f may generate various user interfaces that may be sent to user devices such as user device 160 and/or user device 170 to report results of anomaly analysis and/or to configure anomaly analysis requests.

FIGS. 2A-2J depict an illustrative event sequence for a computing system comprising a plurality of real-time trade processing and centralized reconciliation engines and an anomaly detection and reconciliation mesh analysis engine that collectively implement a dual-system trade reconciliation process in accordance with one or more example embodiments. Aspects of the illustrative event sequence described herein provide effective, efficient, scalable, and convenient technical solutions that address and overcome the technical problems associated with reconciling conflicting trade metadata from a plurality of trade systems.

Figure 2A:
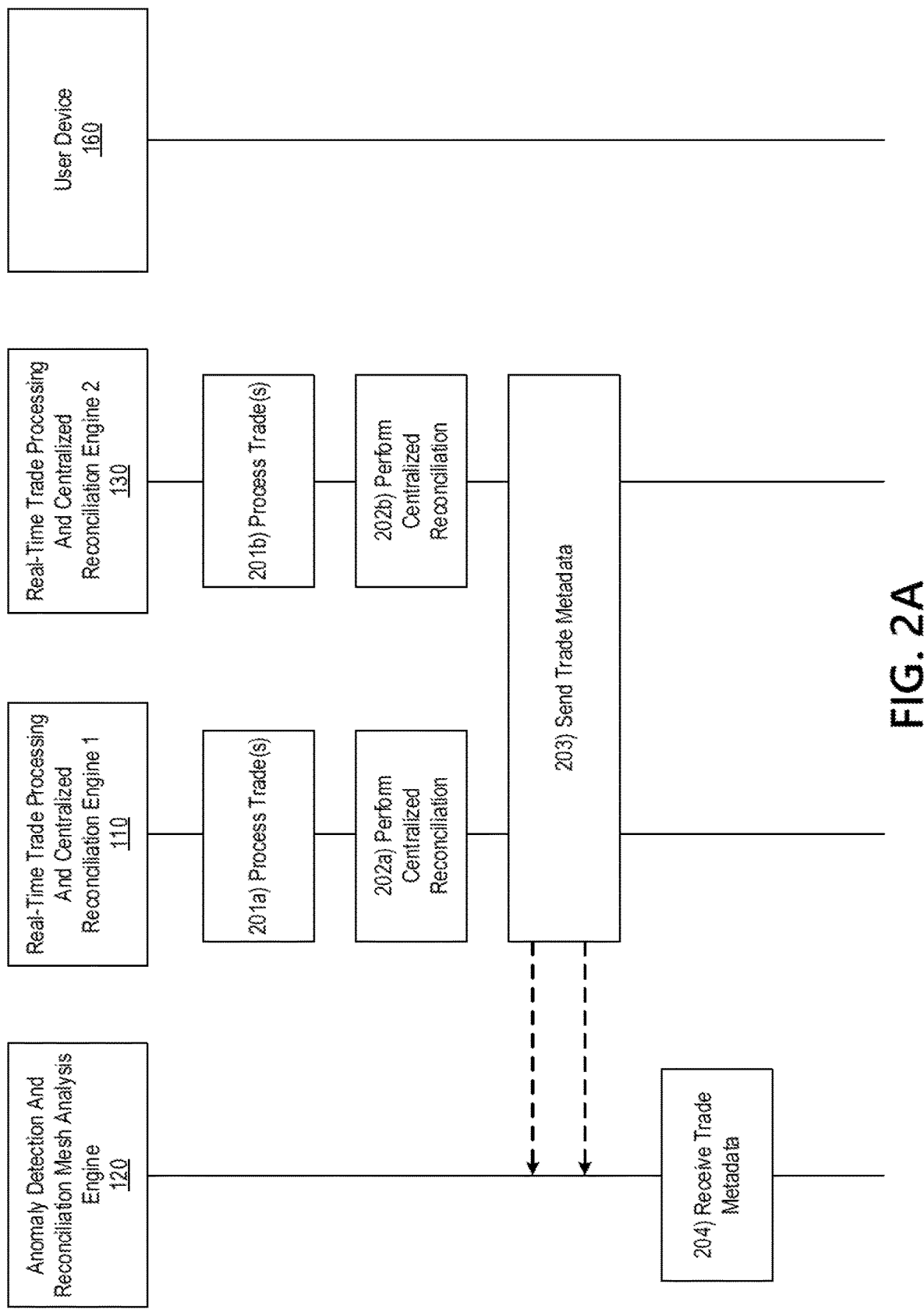

Referring to FIG. 2A, at step 201a, real-time trade processing and centralized reconciliation engine 110 may process one or more trades. Real-time trade processing and centralized reconciliation engine 110 may be continuously processing different trades in real-time at step 201a. The trades processed by real-time trade processing and centralized reconciliation engine 110 may originate from one or more trade systems. The one or more trade systems may be embedded within real-time trade processing and centralized reconciliation engine 110 or may be external to real-time trade processing and centralized reconciliation engine 110. Each trade system of the one or more trade systems is comprised of a trading platform that is available to an enterprise organization, such as a financial institution. The trading platform may be associated with various different enterprise organizations. Real-time trade processing and centralized reconciliation engine 110 may process the one or more trades from the trade systems in real-time. Each trade of the one or more trades may originate from a single trading system, or may be a cross-trade that is associated with a plurality of trade systems. To process a trade, real-time trade processing and centralized reconciliation engine 110 may retrieve trade metadata for a trade from the trade system via its data interface module 112a. The trade metadata for the trade retrieved by real-time trade processing and centralized reconciliation engine 110 may be a subset of the complete trade metadata dataset associated with the trade or may be the complete trade metadata dataset associated with the trade. The trade metadata for the trade may include information identifying the trade, such as a trade identification number, as well as information identifying the originating trade system, such as a trade system identification number. Real-time trade processing and centralized reconciliation engine 110 may tag the trade metadata with the trade identification number and store the trade metadata in memory that is external to real-time trade processing and centralized reconciliation engine 110 or internal to real-time trade processing and centralized reconciliation engine 110 (e.g., memory 112).

At step 201b, real-time trade processing and centralized reconciliation engine 130 may process one or more trades. The architecture and functionality of real-time trade processing and centralized reconciliation engine 130 may be similar to similar to that of real-time trade processing and centralized reconciliation engine 110. Similar to real-time trade processing and centralized reconciliation engine 110, real-time trade processing and centralized reconciliation engine 130 may be continuously processing different trades in real-time at step 201b. The trades processed by real-time trade processing and centralized reconciliation engine 130 may originate from one or more trade systems (which may be the same as or different than those discussed above with reference to step 201a). The one or more trade systems may be embedded within real-time trade processing and centralized reconciliation engine 130 or may be external to real-time trade processing and centralized reconciliation engine 130. Similar to real-time trade processing and centralized reconciliation engine 110, real-time trade processing and centralized reconciliation engine 130 may process the one or more trades from the trade systems in real-time. Each trade of the one or more trades may originate from a single trading system, or may be a cross-trade that is associated with a plurality of trade systems. To process a trade, real-time trade processing and centralized reconciliation engine 130 may retrieve trade metadata for a trade from the trade system via its data interface module 112a. The trade metadata for the trade retrieved by real-time trade processing and centralized reconciliation engine 130 may be a subset of the complete trade metadata dataset associated with the trade or may be the complete trade metadata dataset associated with the trade. The trade metadata for the trade may include information related to the trade itself, information identifying the trade, such as a trade identification number, as well as information identifying the originating trade system, such as a trade system identification number. Real-time trade processing and centralized reconciliation engine 130 may tag the trade metadata with the trade identification number and store the trade metadata in memory that is external to real-time trade processing and centralized reconciliation engine 130 or internal to real-time trade processing and centralized reconciliation engine 130 (e.g., memory 112).

At step 202a, real-time trade processing and centralized reconciliation engine 110 may perform a centralized reconciliation for each trade that is processed by real-time trade processing and centralized reconciliation engine 110 at step 201a via its centralized reconciliation engine 112b. Real-time trade processing and centralized reconciliation engine 110 may be continuously performing the centralized reconciliations of the processed trades in real-time. Real-time trade processing and centralized reconciliation engine 110 may first verify that it has received all of the required trade metadata for a trade from the originating trade system. If real-time trade processing and centralized reconciliation engine 110 determines that the trade metadata for the trade that is received from the originating trade system is incomplete, real-time trade processing and centralized reconciliation engine 110 may send a notification to the originating trade system. The notification may include a request for the missing trade metadata. In response to sending the notification to the originating trade system, real-time trade processing and centralized reconciliation engine 110 may receive the missing trade metadata for the trade. Once real-time trade processing and centralized reconciliation engine 110 has received all of the required trade metadata for a trade, real-time trade processing and centralized reconciliation engine 110 may further analyze the trade metadata to determine whether there is an anomaly with the trade metadata. To analyze the trade metadata, real-time trade processing and centralized reconciliation engine 110 may process the contents of the trade metadata itself, the trade history of the originating trade system associated with the trade, the anomaly history of the originating trade system associated with the trade, and one or more monitory policies associated with the trade (which are stored in policies repository 112c of real-time trade processing and centralized reconciliation engine 110). If the trade is a cross-trade (e.g., associated with multiple trade systems), real-time trade processing and centralized reconciliation engine 110 may analyze the trade history of each trade system associated with the trade and the anomaly history of each trade system associated with the trade. This real-time centralized reconciliation by real-time trade processing and centralized reconciliation engine 110 of the processed trades serves to eliminate basic discrepancies of the various trades that may be processed by real-time trade processing and centralized reconciliation engine 110. If real-time trade processing and centralized reconciliation engine 110 does detect an anomaly in any of its processed trades, it may send a notification to the originating trade system notifying the originating trade system of the anomaly. Additionally, or alternatively, real-time trade processing and centralized reconciliation engine 110 may supplement the trade metadata with information identifying the detected anomaly.

At step 202b, real-time trade processing and centralized reconciliation engine 130 may perform a centralized reconciliation for each trade that is processed by real-time trade processing and centralized reconciliation engine 130 at step 201b via its centralized reconciliation engine 112b. Real-time trade processing and centralized reconciliation engine 130 may be continuously performing the centralized reconciliations of the processed trades in real-time. Real-time trade processing and centralized reconciliation engine 130 may first verify that it has received all of the required trade metadata for a trade from the originating trade system. If real-time trade processing and centralized reconciliation engine 130 determines that the trade metadata for the trade that is received from the originating trade system is incomplete, real-time trade processing and centralized reconciliation engine 130 may send a notification to the originating trade system. The notification may include a request for the missing trade metadata. In response to sending the notification to the originating trade system, real-time trade processing and centralized reconciliation engine 130 may receive the missing trade metadata for the trade. Once real-time trade processing and centralized reconciliation engine 130 has received all of the required trade metadata for a trade, real-time trade processing and centralized reconciliation engine 130 may further analyze the trade metadata to determine whether there is an anomaly with the trade metadata. To analyze the trade metadata, real-time trade processing and centralized reconciliation engine 130 may process the trade history of the originating trade system associated with the trade, the anomaly history of the originating trade system associated with the trade, and one or more monitory policies associated with the trade (which are stored in policies repository 112c of real-time trade processing and centralized reconciliation engine 130). If the trade is a cross-trade (e.g., associated with multiple trade systems), real-time trade processing and centralized reconciliation engine 130 may analyze the trade history of each trade system associated with the trade and the anomaly history of each trade system associated with the trade. This real-time centralized reconciliation by real-time trade processing and centralized reconciliation engine 130 of the processed trades serves to eliminate basic discrepancies of the various trades that may be processed by real-time trade processing and centralized reconciliation engine 130. If real-time trade processing and centralized reconciliation engine 130 does detect an anomaly in any of its processed trades, it may send a notification to the originating trade system notifying the originating trade system of the anomaly. Additionally, or alternatively, real-time trade processing and centralized reconciliation engine 130 may supplement the trade metadata with information identifying the detected anomaly.

At step 203, real-time trade processing and centralized reconciliation engine 110 and real-time trade processing and centralized reconciliation engine 130 may send trade metadata to anomaly detection and reconciliation mesh analysis engine 120. Real-time trade processing and centralized reconciliation engine 110 and real-time trade processing and centralized reconciliation engine 130 may send the trade metadata to anomaly detection and reconciliation mesh analysis engine 120 continuously, in real-time. Alternatively, real-time trade processing and centralized reconciliation engine 110 and real-time trade processing and centralized reconciliation engine 130 may send the trade metadata to anomaly detection and reconciliation mesh analysis engine 120 in batches or at regular-time intervals. The trade metadata sent from real-time trade processing and centralized reconciliation engine 110 and real-time trade processing and centralized reconciliation engine 130 to anomaly detection and reconciliation mesh analysis engine 120 may be the reconciled trade metadata generated at steps 202a and 202b (e.g., the trade metadata stored at steps 201a and 201b and then supplemented with anomaly information, if any, at steps 202a and 202b). The trade metadata may be sent from real-time trade processing and centralized reconciliation engine 110 and real-time trade processing and centralized reconciliation engine 130 to anomaly detection and reconciliation mesh analysis engine 120 via the data interface modules 112a of each of real-time trade processing and centralized reconciliation engine 110 and real-time trade processing and centralized reconciliation engine 130, or via the communication interfaces 115 of real-time trade processing and centralized reconciliation engine 110 and real-time trade processing and centralized reconciliation engine 130. As discussed above with reference to steps 201a and 201b, the trade metadata for any given trade may include information related to the trade itself, information identifying the trade, such as a trade identification number, as well as information identifying the originating trade system, such as a trade system identification number.

The trade metadata sent from real-time trade processing and centralized reconciliation engine 110 and real-time trade processing and centralized reconciliation engine 130 may be associated with same trade(s) and/or with different trade(s). When the trade metadata sent from real-time trade processing and centralized reconciliation engine 110 and real-time trade processing and centralized reconciliation engine 130 to anomaly detection and reconciliation mesh analysis engine 120 is associated with the same trade, at least a part of the contents of the trade metadata from each of real-time trade processing and centralized reconciliation engine 110 and real-time trade processing and centralized reconciliation engine 130 may be different. For example, as discussed above with reference to steps 201a and 201b, the trade metadata received by each of real-time trade processing and centralized reconciliation engine 110 and real-time trade processing and centralized reconciliation engine 130 for any given trade may comprise a subset of the trade metadata generated for that trade by the originating trade system. Thus, in this example, the trade metadata sent from real-time trade processing and centralized reconciliation engine 110 to anomaly detection and reconciliation mesh analysis engine 120 for a trade may include a first subset of the trade metadata generated for the trade by the originating trade system, while the trade metadata sent from real-time trade processing and centralized reconciliation engine 130 to anomaly detection and reconciliation mesh analysis engine 120 for the same trade may include a second subset of the trade metadata generated for the same trade by the originating trade system, wherein the first subset and the second subset are different.

Further, when the trade metadata sent from real-time trade processing and centralized reconciliation engine 110 and real-time trade processing and centralized reconciliation engine 130 to anomaly detection and reconciliation mesh analysis engine 120 is associated with the same trade, at least a part of the contents of the trade metadata from each of real-time trade processing and centralized reconciliation engine 110 and real-time trade processing and centralized reconciliation engine 130 may be the same. For example, as discussed above with respect to steps 201a and 201b, each of real-time trade processing and centralized reconciliation engine 110 and real-time trade processing and centralized reconciliation engine 130 may tag the trade metadata with a trade identification number prior to storing the trade metadata, and in the case when the trade metadata sent from real-time trade processing and centralized reconciliation engine 110 and real-time trade processing and centralized reconciliation engine 130 to anomaly detection and reconciliation mesh analysis engine 120 is for the same trade, both sets of trade metadata may be tagged with the same trade identification number. At step 204, anomaly detection and reconciliation mesh analysis engine 120 may receive the trade metadata from real-time trade processing and centralized reconciliation engine 110 and real-time trade processing and centralized reconciliation engine 130. Anomaly detection and reconciliation mesh analysis engine 120 may receive the trade metadata from real-time trade processing and centralized reconciliation engine 110 and real-time trade processing and centralized reconciliation engine 130 via its data interface module 112a. Responsive to receiving the trade metadata from real-time trade processing and centralized reconciliation engine 110 and real-time trade processing and centralized reconciliation engine 130, anomaly detection and reconciliation mesh analysis engine 120 may store the trade metadata in internal and/or external memory.

Referring to FIG. 2B, at step 205, anomaly detection and reconciliation mesh analysis engine 120 may generate tokenized trade metadata from the trade metadata received at step 204. Step 205 may be performed by the metadata tokenization and digital DNA token generation module 122b of anomaly detection and reconciliation mesh analysis engine 120. Anomaly detection and reconciliation mesh analysis engine 120 may generate separate tokenized trade metadata for each separate trade metadata received from a real-time trade processing and centralized reconciliation engine, such as real-time trade processing and centralized reconciliation engine 110 and real-time trade processing and centralized reconciliation engine 130. If anomaly detection and reconciliation mesh analysis engine 120 is configured to continuously receive trade metadata from real-time trade processing and centralized reconciliation engine 110 and real-time trade processing and centralized reconciliation engine 130 in real-time, anomaly detection and reconciliation mesh analysis engine 120 may further be configured to continuously generate the tokenized trade metadata in real-time as it is received. To tokenize the trade metadata, anomaly detection and reconciliation mesh analysis engine 120 may replace sensitive or confidential data within the trade metadata with a token (e.g., randomized data string). The particular data fields within each trade metadata that are to be tokenized may be preconfigured by an enterprise organization associated with the anomaly detection and reconciliation mesh analysis engine 120, or may be determined in real-time by the anomaly detection and reconciliation mesh analysis engine 120 as it receives and analyzes the trade metadata. Anomaly detection and reconciliation mesh analysis engine 120 may store each of the tokenized trade metadata generated at step 205 in internal or external memory.

At step 206, anomaly detection and reconciliation mesh analysis engine 120 may generate, based on the tokenized trade metadata, tokenized trade digital DNA. Step 206 may be performed by the metadata tokenization and digital DNA token generation module 122b of anomaly detection and reconciliation mesh analysis engine 120. The tokenized trade digital DNA may include multiple strands of tokenized digital data, wherein each strand of tokenized digital data may be associated with a different trade. As discussed above with reference to steps 201a and 201b, each trade metadata that is generated by a real-time trade processing and centralized reconciliation engine such as real-time trade processing and centralized reconciliation engine 110 and/or real-time trade processing and centralized reconciliation engine 130 may include a trade identification number and trade system identification number. To generate the tokenized trade digital DNA, anomaly detection and reconciliation mesh analysis engine 120 may analyze its stored tokenized trade metadata and group together all of the tokenized trade metadata that is tagged with a same trade identification number. Anomaly detection and reconciliation mesh analysis engine 120 may then retrieve one or more trade system markers that are associated with the trade system identified by the trade system identification number of the tokenized trade metadata. The trade system markers may be stored by the anomaly detection and reconciliation mesh analysis engine 120, or retrieved from the trade system in real-time by anomaly detection and reconciliation mesh analysis engine 120. Anomaly detection and reconciliation mesh analysis engine 120 may then algorithmically combine the trade system markers with the group of tokenized trade metadata to generate one strand of the tokenized trade digital DNA. Anomaly detection and reconciliation mesh analysis engine 120 may repeat this process for each of the different trade identification numbers represented within the tokenized trade metadata.

At step 207, anomaly detection and reconciliation mesh analysis engine 120 may perform hashing on the tokenized trade digital DNA. Step 207 may be performed by the hash-based anomaly detection module 122c of anomaly detection and reconciliation mesh analysis engine 120. To generate the hashed tokenized digital DNA, anomaly detection and reconciliation mesh analysis engine 120 may use one or more hashing algorithms. Each hashing algorithm may be a deterministic algorithm (e.g., repeatedly produce the same hash for a given input) that uses all of the tokenized trade metadata for a given trade, and that produces different hashes for different tokenized trade metadata. Anomaly detection and reconciliation mesh analysis engine 120 may apply the hashing algorithms to each tokenized trade metadata in one or more strands of tokenized trade metadata to generate the hashed tokenized trade metadata digital DNA. Anomaly detection and reconciliation mesh analysis engine 120 may additionally or alternatively apply the hashing algorithms to one or more individual strands of the tokenized trade digital DNA to generate the hashed tokenized trade metadata digital DNA. Anomaly detection and reconciliation mesh analysis engine 120 may additionally or alternatively apply the hashing algorithm to the tokenized trade digital DNA in its entirety to generate a hashed tokenized trade metadata digital DNA. At step 208, anomaly detection and reconciliation mesh analysis engine 120 may store the hashed tokenized trade metadata digital DNA in memory that is internal to anomaly detection and reconciliation mesh analysis engine 120 or external to anomaly detection and reconciliation mesh analysis engine 120.

Referring to FIG. 2C, at step 209, anomaly detection and reconciliation mesh analysis engine 120 may compare the hashed data to detect any anomalies within the hashed data. Step 209 may be performed by the hash-based anomaly detection module 122c of anomaly detection and reconciliation mesh analysis engine 120. At discussed above with reference to step 207, in one example anomaly detection and reconciliation mesh analysis engine 120 may apply the hashing algorithms to each tokenized trade metadata in one or more strands of tokenized trade metadata to generate the hashed tokenized trade metadata digital DNA. In this example, at step 209, anomaly detection and reconciliation mesh analysis engine 120 may compare each of the hashed tokenized trade metadata to determine whether there are any anomalies in the hashed data. In another example discussed above with reference to step 207, anomaly detection and reconciliation mesh analysis engine 120 may additionally or alternatively apply the hashing algorithms to one or more individual strands of the tokenized trade digital DNA to generate the hashed tokenized trade metadata digital DNA. In this example, at step 209, anomaly detection and reconciliation mesh analysis engine 120 may compare a hashed strand of tokenized trade metadata to another hashed strand of tokenized trade metadata (within the same hashed tokenized trade metadata digital DNA structure or from a different hashed tokenized trade metadata digital DNA structure generated by anomaly detection and reconciliation mesh analysis engine 120) to determine whether there are any anomalies in the hashed data. In another example, at step 207, anomaly detection and reconciliation mesh analysis engine 120 may apply the hashing algorithm to the tokenized trade digital DNA in its entirety to generate a hashed tokenized trade metadata digital DNA. In this example, at step 209, anomaly detection and reconciliation mesh analysis engine 120 may compare an entire hashed tokenized trade metadata digital DNA structure to another hashed tokenized trade metadata digital DNA structure to determine if there are any anomalies in the hashed data.

If anomaly detection and reconciliation mesh analysis engine 120 detects any anomalies based on the comparing of the hashed data, anomaly detection and reconciliation mesh analysis engine 120 (and specifically, its suspicious activity validation and evaluation module 122*d*) may flag, at step 210, the hashed data as suspicious. The suspicious activity validation and evaluation module 122*d* may then evaluate the flagged hashed data to confirm the anomaly. To confirm the anomaly, anomaly detection and reconciliation mesh analysis engine 120 may compare the hashed data to historical data stored at the anomaly detection and reconciliation mesh analysis engine 120 that was flagged for a similar anomaly. Alternatively, or additionally, anomaly detection and reconciliation mesh analysis engine 120 may confirm the anomaly by performing additional analysis of the hashed data.

Once anomaly detection and reconciliation mesh analysis engine 120 has validated and evaluated the hashed data in which one or more anomalies has been detected, anomaly detection and reconciliation mesh analysis engine 120 may perform decentralized reconciliation mesh analysis at step 211 by inputting the hashed data into the decentralized reconciliation mesh that is generated and maintained by AI-based reconciliation mesh training and execution module 122*e* of anomaly detection and reconciliation mesh analysis engine 120. The decentralized reconciliation mesh may be powered by artificial intelligence cognitive algorithms. The decentralized reconciliation mesh may have been previously trained by AI-based reconciliation mesh training and execution module 122*e* of anomaly detection and reconciliation mesh analysis engine 120 using trade metadata (including trade metadata that was hashed and marked as suspicious and trade metadata that was hashed but in which no anomalies were detected) in the form of original trade metadata received from real-time trade processing and centralized reconciliation engines such as real-time trade processing and centralized reconciliation engine 110 and real-time trade processing and centralized reconciliation engine 130, tokenized trade metadata generated by anomaly detection and reconciliation mesh analysis engine 120 based on the original trade metadata, tokenized trade metadata digital DNA and/or hashed tokenized trade metadata digital DNA, various rules and regulations, and monitory policies. The decentralized reconciliation mesh may have been further trained using monitory policies, which may be comprised of various rules and regulations governing original trade metadata, tokenized trade metadata, tokenized trade metadata digital DNA, hashed tokenized trade metadata digital DNA, or any hashed data in which anomalies were previously detected.

At step 212, anomaly detection and reconciliation mesh analysis engine 120 may receive, from the decentralized reconciliation mesh, a plurality of monitory policies. The plurality of monitory policies may have been generated by the decentralized reconciliation mesh based on the inputted suspicious hashed data and the AI cognitive algorithms that power the decentralized reconciliation mesh. The plurality of monitory policies may each comprise a mitigation measure directed to responding to the one or more anomalies that were detected in the inputted hashed data.

Figure 2D:
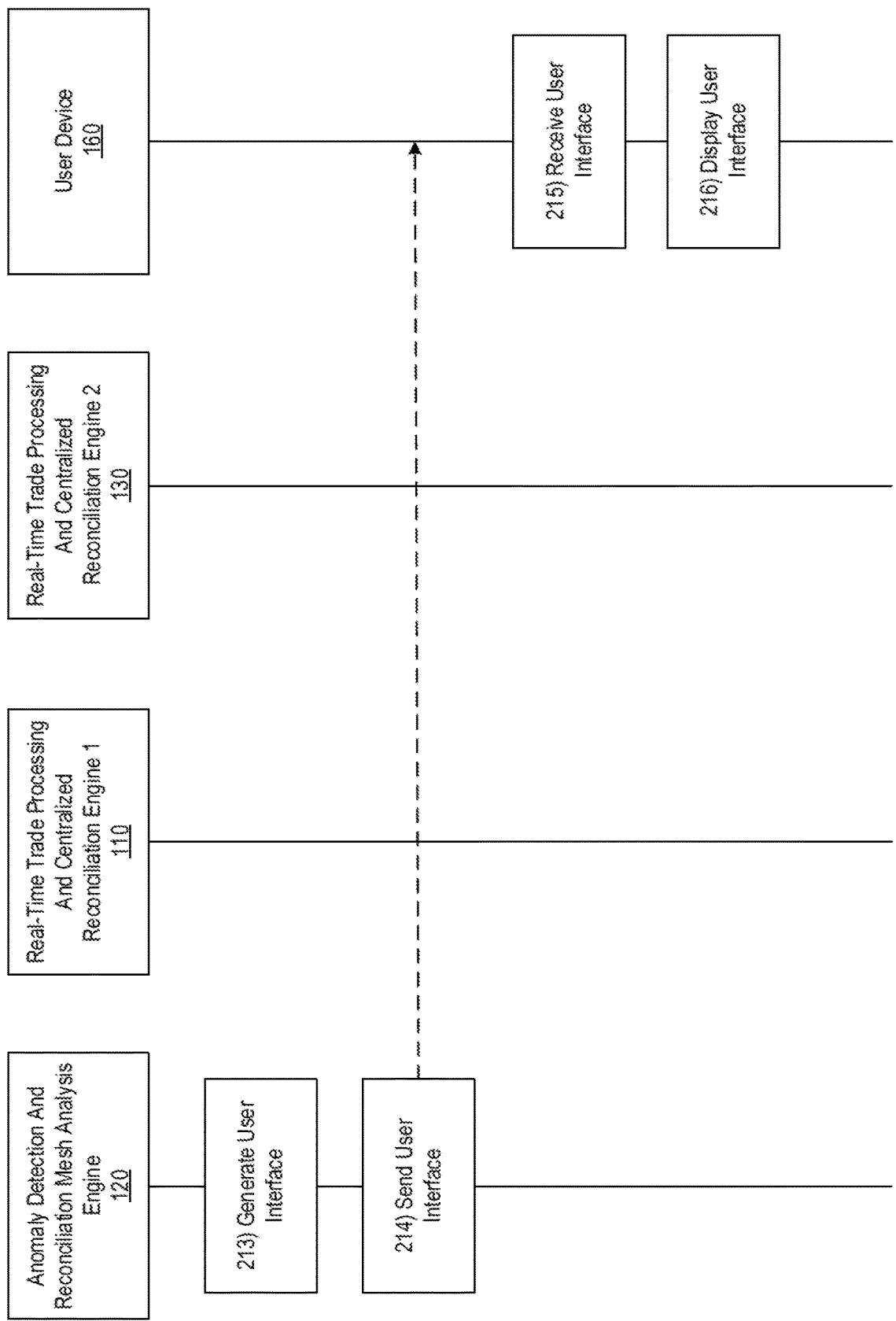
Figure 3A:
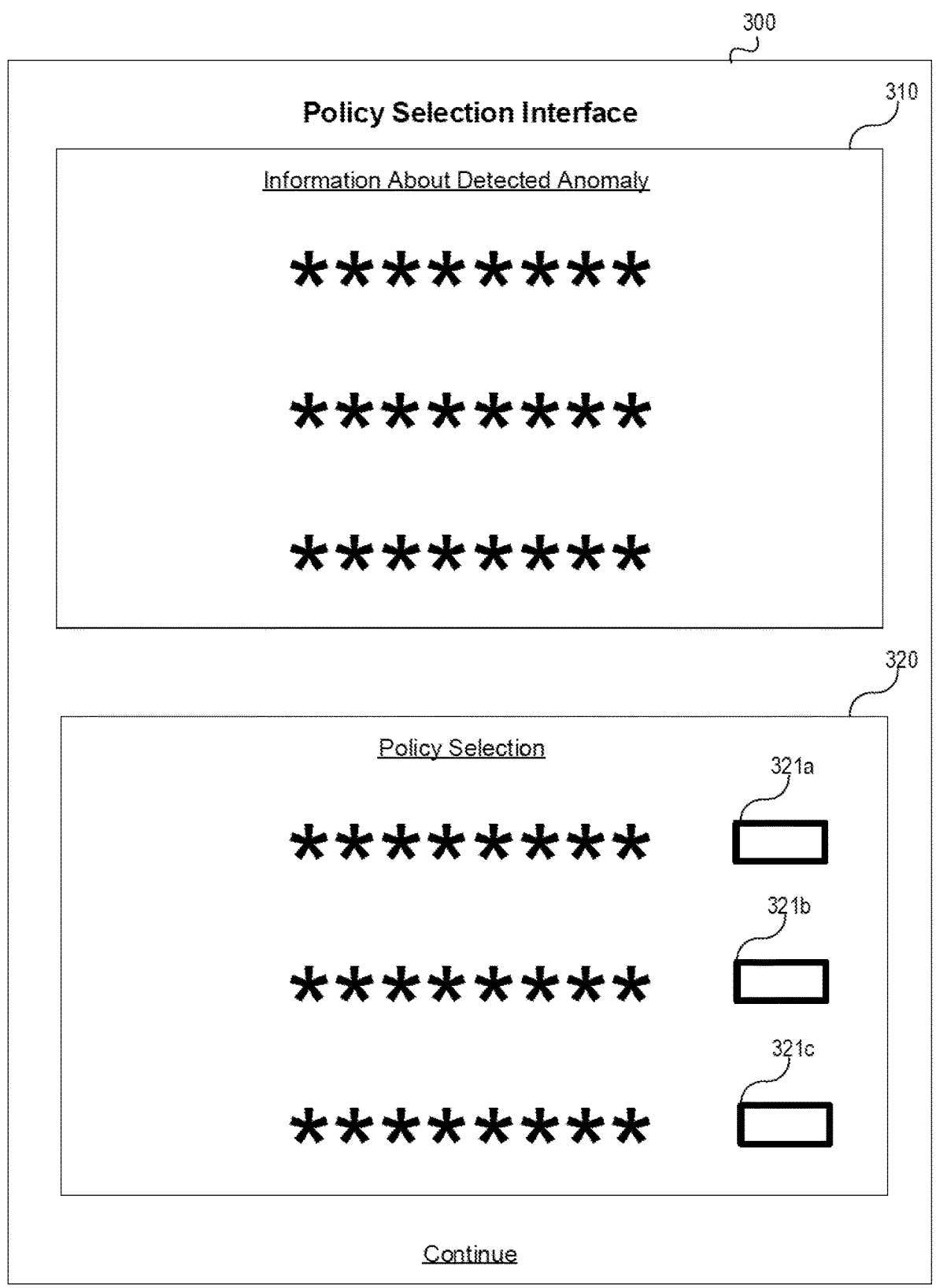

Referring to FIG. 2D, at step 213, anomaly detection and reconciliation mesh analysis engine 120 may generate a first user interface using its dynamic API module 122*f*. Referring to FIG. 3A, an exemplary first user interface 300 that may be generated by anomaly detection and reconciliation mesh analysis engine 120 at step 213 is illustrated. First user interface 300 may be directed to allowing one or more individuals associated with the enterprise organization associated with anomaly detection and reconciliation mesh analysis engine 120 to analyze both the detected anomalies and the monitory policies generated by the decentralized reconciliation mesh. In particular a first section 310 of first user interface 300 may display data associated with the detected anomalies, such as data identifying the anomalies and/or the underlying data in which the anomalies were detected (for example, the hashed original trade metadata received from real-time trade processing and centralized reconciliation engines such as real-time trade processing and centralized reconciliation engine 110 and real-time trade processing and centralized reconciliation engine 130, tokenized trade metadata generated by anomaly detection and reconciliation mesh analysis engine 120 based on the original trade metadata, tokenized trade metadata digital DNA and/or hashed tokenized trade metadata digital DNA). A second section 320 of first user interface 300 may display information associated with the plurality of monitory policies generated by the decentralized reconciliation mesh. In one example, anomaly detection and reconciliation mesh analysis engine 120 (or the decentralized reconciliation mesh) may have ranked the monitory policies based on one or more ranking parameters, and section 320 may display the monitory policies in the order in which they are ranked. Any of the displayed monitory policies may be selected by a user using selection indicators 321*a*-321*c* of first user interface 300.

With further reference to FIG. 2D, at step 214, anomaly detection and reconciliation mesh analysis engine 120 may send first user interface 300 generated at step 213 to user device 160. At step 215, user device 160 may receive first user interface 300 sent from anomaly detection and reconciliation mesh analysis engine 120 at step 214. The sending of first user interface 300 from anomaly detection and reconciliation mesh analysis engine 120 to user device 160 and/or the receiving of first user interface 300 by user device 160 from anomaly detection and reconciliation mesh analysis engine 120 may be configured to cause user device 160 to output first user interface 300 for display at a display device of user device 160. Accordingly, at step 216, user device 160 may output first user interface 300 for display at the display device of user device 160. Referring to FIG. 2E, at step 217, user device 160 may receive, via first user interface 300, a selection of a first monitory policy. The first monitory policy may be a monitory policy that was displayed in section 320 of first user interface 300 (discussed above with reference to FIG. 3A). At step 218, user device 160 may send the selection of the first monitory policy to anomaly detection and reconciliation mesh analysis engine 120. At step 219, anomaly detection and reconciliation mesh analysis engine 120 may receive the selected first monitory policy from user device 160. At step 220, anomaly detection and reconciliation mesh analysis engine 120 may update the decentralized reconciliation mesh with the first monitory policy. Anomaly detection and reconciliation mesh analysis engine 120 may update the decentralized reconciliation mesh with the first monitory policy by creating, within the decentralized reconciliation mesh, an association between the anomalies that were inputted into the decentralized reconciliation mesh at step 211 and the selected first monitory policy which was received by anomaly detection and reconciliation mesh analysis engine 120 from user device 160 at step 219.

Figure 2F:
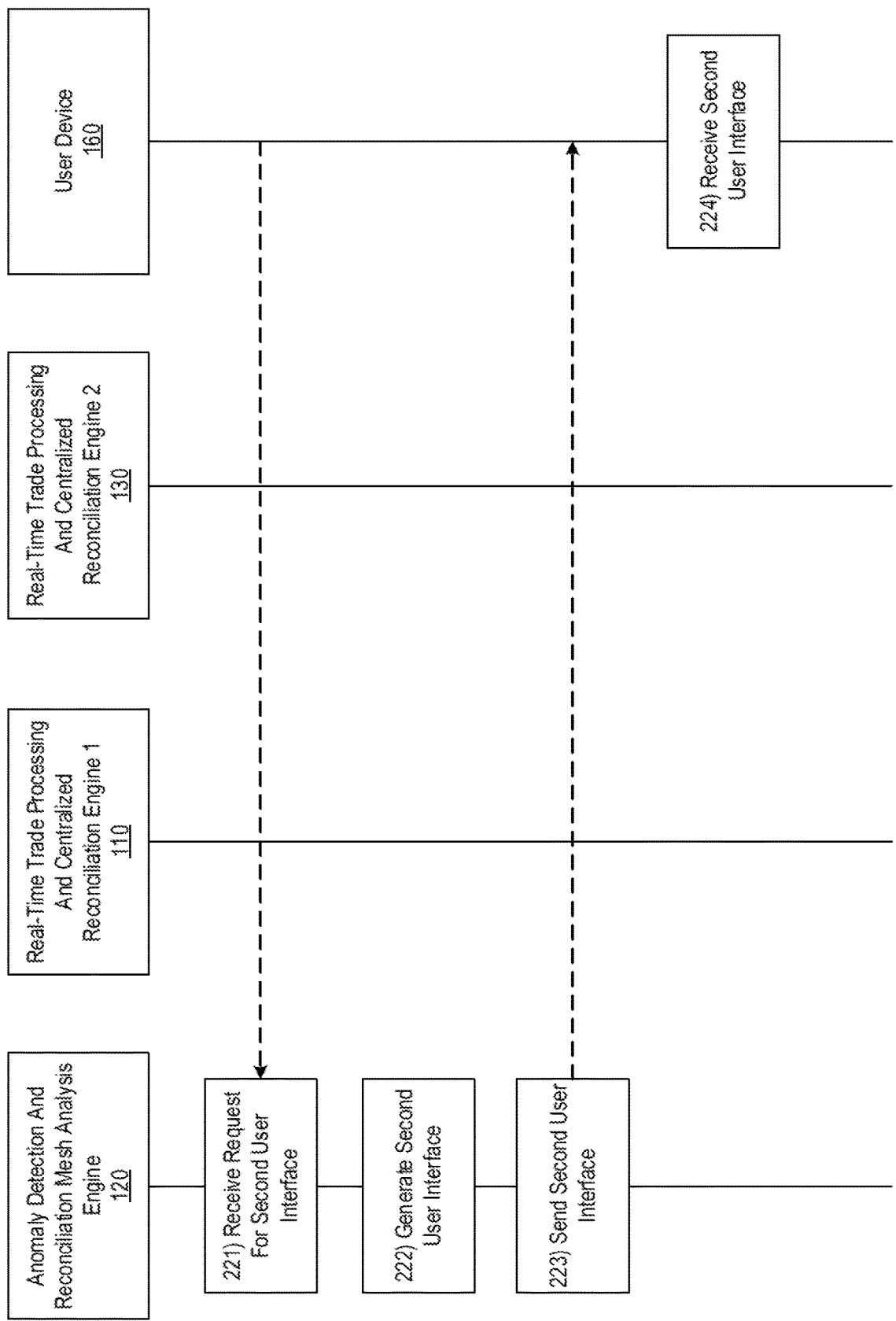

Referring to FIG. 2F, at step 221, anomaly detection and reconciliation mesh analysis engine 120 may receive a request for a second user interface (350 in FIG. 3B) from user device 160. The second user interface 350 may be a user interface configured to allow a user of user device 160 to request an anomaly analysis from anomaly detection and reconciliation mesh analysis engine 120. In response to receiving the request for second user interface 350, anomaly detection and reconciliation mesh analysis engine 120 may generate, at step 222 and via its dynamic API module 122*c*, a second user interface 350. Referring to FIG. 3B, an illustrative second user interface 350 generated by anomaly detection and reconciliation mesh analysis engine 120 at step 222 is shown. Second user interface 350 includes a section 360 that allows a user to input or select files storing various trade metadata that is to be analyzed by anomaly detection and reconciliation mesh analysis engine 120 during the anomaly analysis. The trade metadata may comprise one or more of original trade metadata received from real-time trade processing and centralized reconciliation engines such as real-time trade processing and centralized reconciliation engine 110 and real-time trade processing and centralized reconciliation engine 130, tokenized trade metadata generated by anomaly detection and reconciliation mesh analysis engine 120 based on the original trade metadata, tokenized trade metadata digital DNA and/or hashed tokenized trade metadata digital DNA. Second user interface 350 also includes a section 370 that allows a user to input or select files storing variances on existing rules and regulations governing the trade metadata, and/or the monitory policies governing the anomaly analysis of the trade metadata. For example, the user may want anomaly detection and reconciliation mesh analysis engine 120 to perform an anomaly analysis on existing trade metadata that uses a modified monitory policy so that the user may determine whether an existing monitory policy should be replaced with the modified monitory policy. Using section 370, the user may specify the file that stores the modified monitory policy that is to be used by anomaly detection and reconciliation mesh analysis engine 120 during the anomaly analysis. With further reference to FIG. 2F, at step 223, anomaly detection and reconciliation mesh analysis engine 120 may send second user interface 350 generated at step 222 to user device 160. At step 224, user device 160 may receive second user interface 350 from anomaly detection and reconciliation mesh analysis engine 120. The sending of second user interface 350 from anomaly detection and reconciliation mesh analysis engine 120 to user device 160 and/or the receiving of second user interface 350 by the user device 160 from anomaly detection and reconciliation mesh analysis engine 120 may be configured to cause user device 160 to output second user interface 350 for display on a display device of user device 160.

Figure 2G:
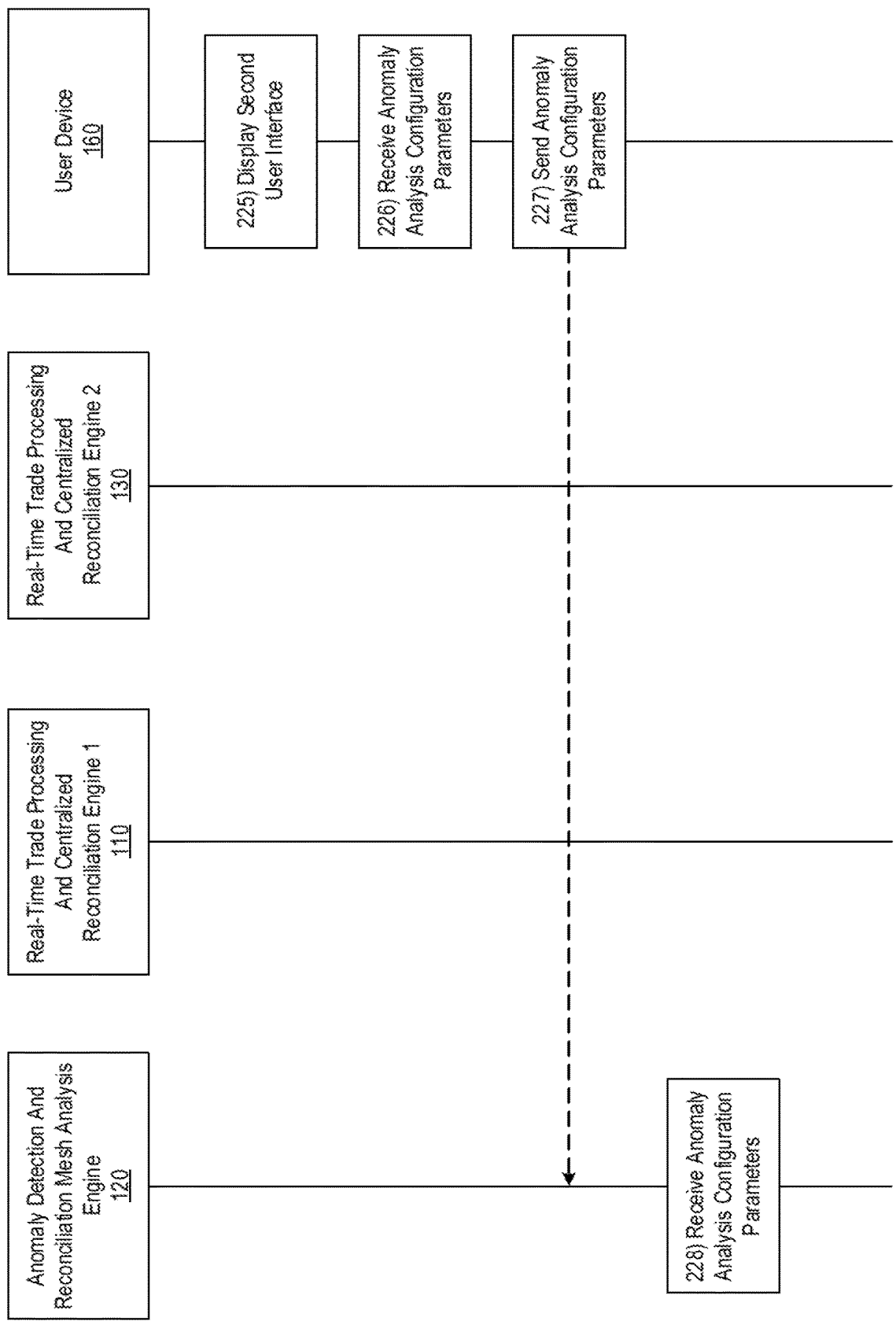

Referring to FIG. 2G, at step 225, user device 160 may display second user interface 350 generated by anomaly detection and reconciliation mesh analysis engine 120 at a display device of user device 160. At step 226, user device 160 may receive, via second user interface 350 that output for display at the display device of user device 160, one or more anomaly analysis configuration parameters. As discussed above with reference to FIG. 3B, these anomaly analysis configuration parameters may include the trade metadata on which anomaly detection and reconciliation mesh analysis engine 120 is to perform the anomaly analysis, along with variances on existing rules and regulations governing the trade metadata, and/or the monitory policies governing the anomaly analysis of the trade metadata. The trade metadata may comprise trade metadata for one or more trades, each trade associated with one or more trading systems. The trade metadata may have been generated by one or more real-time trade processing and centralized reconciliation engines. For example, the trade metadata may comprise first trade metadata from a first real-time trade processing and centralized reconciliation engine and second trade metadata from a second real-time trade processing and centralized reconciliation engine. The first trade metadata and the second trade metadata may be associated with a same trade (e.g., subsets of trade metadata for a same trade) or for different trades. At step 227, user device 160 may send the one or more anomaly analysis configuration parameters received via second user interface 350 to anomaly detection and reconciliation mesh analysis engine 120. At step 228, anomaly detection and reconciliation mesh analysis engine 120 may receive the one or more anomaly analysis configuration parameters from user device 160.

Figure 2H:
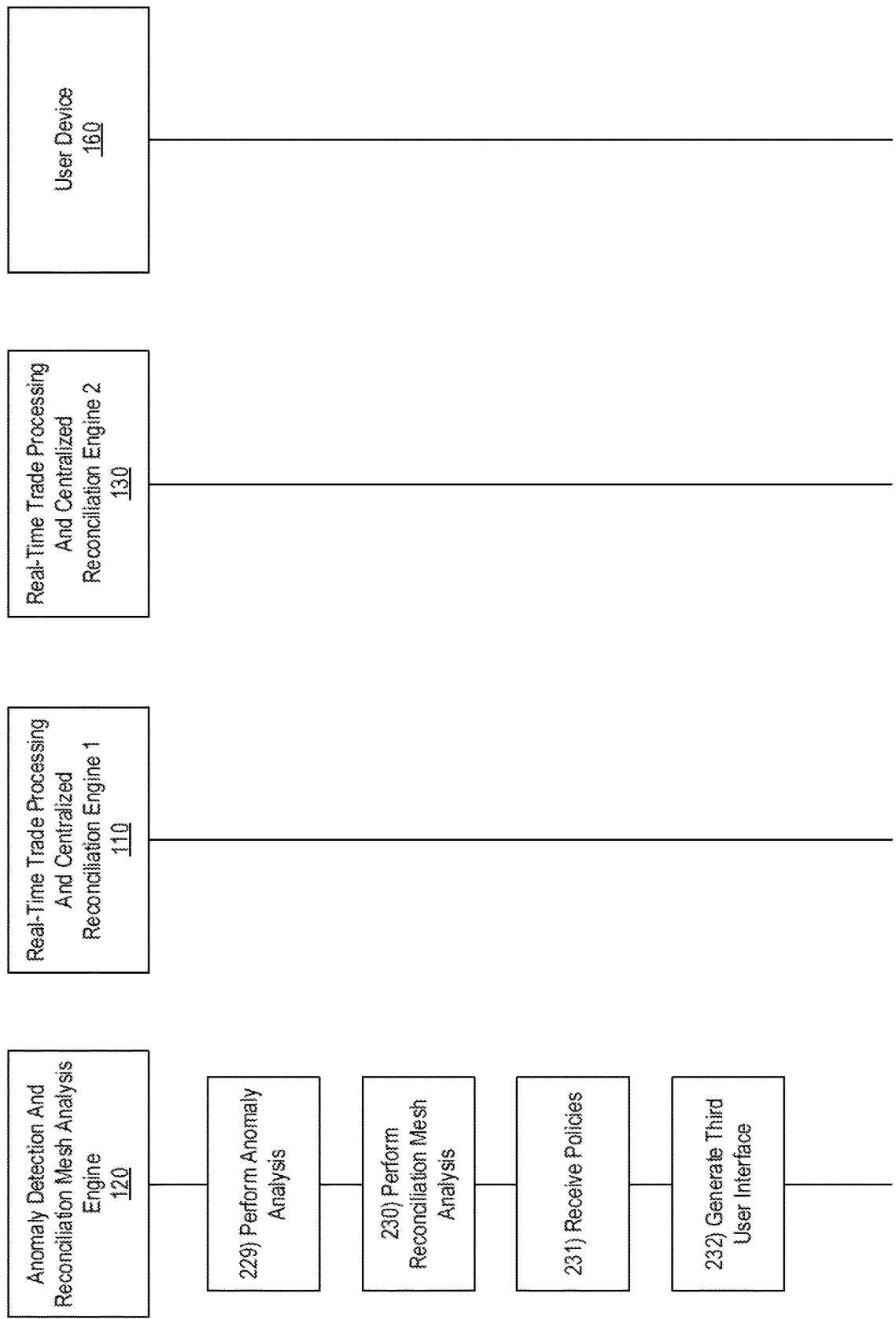
Figure 21:
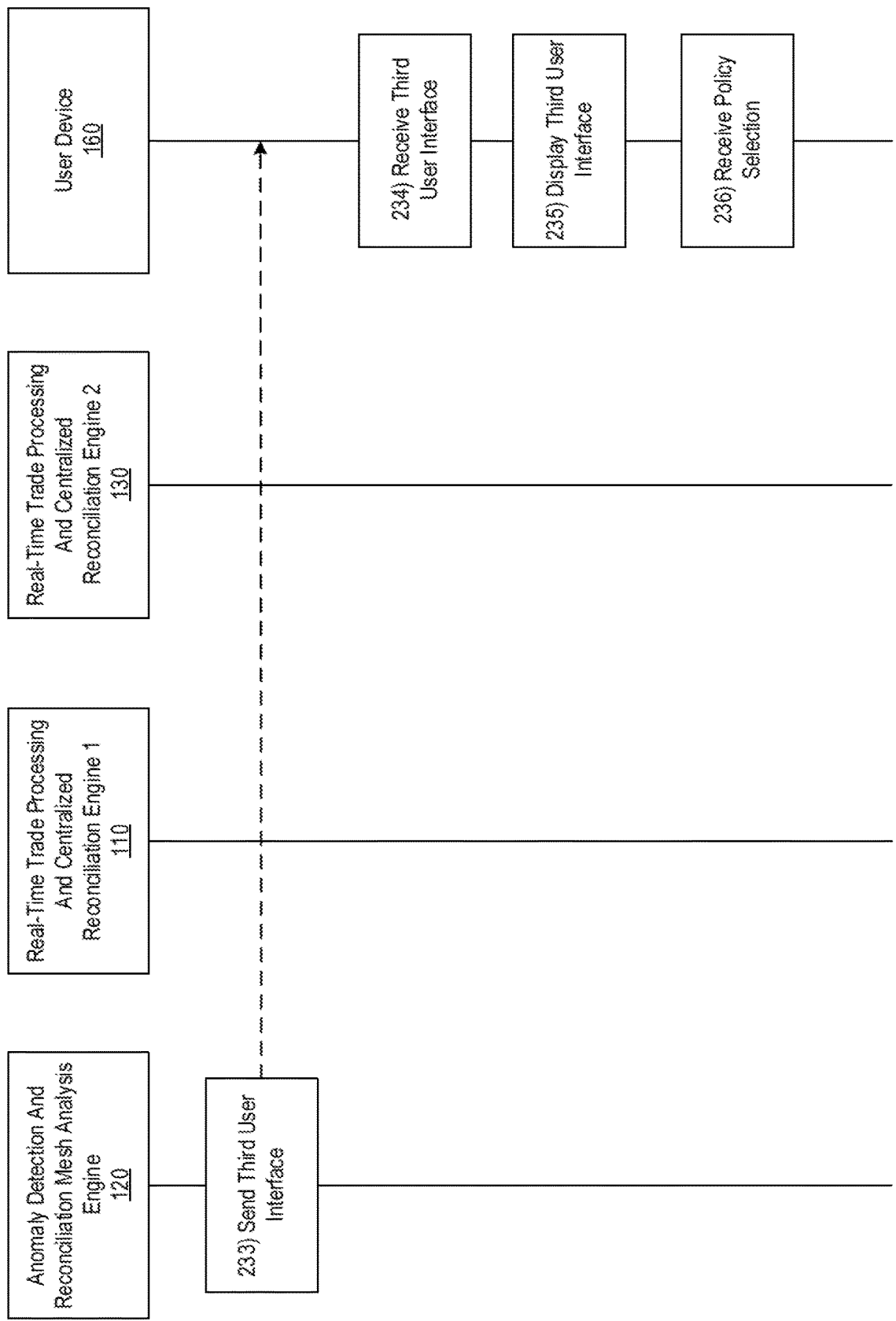

Referring to FIG. 2H, at step 229, anomaly detection and reconciliation mesh analysis engine 120 may perform the anomaly analysis. To perform the anomaly analysis, anomaly detection and reconciliation mesh analysis engine 120 may first determine whether the trade metadata received as part of the one or more anomaly analysis configuration parameters from user device 160 at step 227 was previously hashed by anomaly detection and reconciliation mesh analysis engine 120. If the trade metadata was not previously hashed by anomaly detection and reconciliation mesh analysis engine 120, (for example, if the trade metadata is in the form of original trade metadata received from real-time trade processing and centralized reconciliation engines such as real-time trade processing and centralized reconciliation engine 110 and real-time trade processing and centralized reconciliation engine 130), anomaly detection and reconciliation mesh analysis engine 120 may tokenize and hash the trade metadata. The tokenization and hashing may be performed by the metadata tokenization and digital DNA token generation module 122*b* of anomaly detection and reconciliation mesh analysis engine 120. Anomaly detection and reconciliation mesh analysis engine 120 may generate separate tokenized trade metadata for each separate trade metadata received from user device 160. To tokenize the trade metadata, anomaly detection and reconciliation mesh analysis engine 120 may replace sensitive or confidential data within the trade metadata with a token (e.g., randomized data string). The particular data fields within each trade metadata that are to be tokenized may be preconfigured by an enterprise organization associated with the anomaly detection and reconciliation mesh analysis engine 120, or may be determined in real-time by the anomaly detection and reconciliation mesh analysis engine 120 as it receives and analyzes the trade metadata. Anomaly detection and reconciliation mesh analysis engine 120 may store each of the tokenized trade metadata in internal or external memory.

Anomaly detection and reconciliation mesh analysis engine 120 may then generate, based on the tokenized trade metadata that is generated by anomaly detection and reconciliation mesh analysis engine 120 from the trade metadata received from user device 160, tokenized trade digital DNA. The tokenized trade digital DNA may be generated by the metadata tokenization and digital DNA token generation module 122b of anomaly detection and reconciliation mesh analysis engine 120. The tokenized trade digital DNA may include multiple strands of tokenized digital data, wherein each strand of tokenized digital data may be associated with a different trade. As discussed above, each trade metadata may include a trade identification number and a trade system identification number. To generate the tokenized trade digital DNA, anomaly detection and reconciliation mesh analysis engine 120 may analyze its stored tokenized trade metadata and group together all of the tokenized trade metadata that is tagged with a same trade identification number. Anomaly detection and reconciliation mesh analysis engine 120 may then retrieve one or more trade system markers that are associated with the trade system identified by the trade system identification number of the tokenized trade metadata. The trade system markers may be stored by the anomaly detection and reconciliation mesh analysis engine 120, or retrieved from the trade system in real-time by anomaly detection and reconciliation mesh analysis engine 120. Anomaly detection and reconciliation mesh analysis engine 120 may then algorithmically combine the trade system markers with the group of tokenized trade metadata to generate one strand of the tokenized trade digital DNA. Anomaly detection and reconciliation mesh analysis engine 120 may repeat this process for each of the different trade identification numbers represented within the tokenized trade metadata.

Anomaly detection and reconciliation mesh analysis engine 120 may then perform hashing on the tokenized trade digital DNA. The hashing may be performed by the hash-based anomaly detection module 122c of anomaly detection and reconciliation mesh analysis engine 120. To generate the hashed tokenized digital DNA, anomaly detection and reconciliation mesh analysis engine 120 may use one or more hashing algorithms. Anomaly detection and reconciliation mesh analysis engine 120 may apply the hashing algorithms to each tokenized trade metadata in one or more strands of tokenized trade metadata to generate the hashed tokenized trade metadata digital DNA. Anomaly detection and reconciliation mesh analysis engine 120 may additionally or alternatively apply the hashing algorithms to one or more individual strands of the tokenized trade digital DNA to generate the hashed tokenized trade metadata digital DNA. Anomaly detection and reconciliation mesh analysis engine 120 may additionally or alternatively apply the hashing algorithm to the tokenized trade digital DNA in its entirety to generate a hashed tokenized trade metadata digital DNA. Anomaly detection and reconciliation mesh analysis engine 120 may store the hashed tokenized trade metadata digital DNA in memory that is internal to anomaly detection and reconciliation mesh analysis engine 120 or external to anomaly detection and reconciliation mesh analysis engine 120.

Anomaly detection and reconciliation mesh analysis engine 120 may then compare the hashed data to detect any anomalies within the hashed data. For example, if anomaly detection and reconciliation mesh analysis engine 120 generated the hashed data by applying the hashing algorithms to each tokenized trade metadata in one or more strands of tokenized trade metadata, anomaly detection and reconciliation mesh analysis engine 120 may compare each of the hashed tokenized trade metadata to determine whether there are any anomalies in the hashed data. In another example, if anomaly detection and reconciliation mesh analysis engine 120 generated the hashed data by applying the hashing algorithms to one or more individual strands of the tokenized trade digital DNA, anomaly detection and reconciliation mesh analysis engine 120 may compare a hashed strand of tokenized trade metadata to another hashed strand of tokenized trade metadata (within the same hashed tokenized trade metadata digital DNA structure or from a different hashed tokenized trade metadata digital DNA structure generated by anomaly detection and reconciliation mesh analysis engine 120) to determine whether there are any anomalies in the hashed data. In another example, if anomaly detection and reconciliation mesh analysis engine 120 generated the hashed data by applying the hashing algorithm to the tokenized trade digital DNA in its entirety, anomaly detection and reconciliation mesh analysis engine 120 may compare an entire hashed tokenized trade metadata digital DNA structure to another hashed tokenized trade metadata digital DNA structure to determine if there are any anomalies in the hashed data.

If anomaly detection and reconciliation mesh analysis engine 120 detects any anomalies based on the comparing of the hashed data, anomaly detection and reconciliation mesh analysis engine 120 (and specifically, its suspicious activity validation and evaluation module 122d) may flag the hashed data as suspicious. The suspicious activity validation and evaluation module 122d may then evaluate the flagged hashed data to confirm the anomaly. To confirm the anomaly, anomaly detection and reconciliation mesh analysis engine 120 may compare the hashed data to historical data stored at the anomaly detection and reconciliation mesh analysis engine 120 that was flagged for a similar anomaly. Alternatively, or additionally, anomaly detection and reconciliation mesh analysis engine 120 may confirm the anomaly by performing additional analysis of the hashed data.

Once anomaly detection and reconciliation mesh analysis engine 120 has validated and evaluated the hashed data in which one or more anomalies has been detected, anomaly detection and reconciliation mesh analysis engine 120 may perform decentralized reconciliation mesh analysis at step 230 by inputting the hashed data into the decentralized reconciliation mesh. If the one or more anomaly analysis configuration parameters received by anomaly detection and reconciliation mesh analysis engine 120 at step 228 included variances on existing rules and regulations governing the trade metadata, and/or the monitory policies governing the anomaly analysis of the trade metadata, anomaly detection and reconciliation mesh analysis engine 120 may also input these variances into the decentralized reconciliation mesh. At step 231, anomaly detection and reconciliation mesh analysis engine 120 may receive, from the decentralized reconciliation mesh, a plurality of monitory policies. The plurality of monitory policies may have been generated by the decentralized reconciliation mesh based on the inputted suspicious hashed data, the inputted variances, and the AI cognitive algorithms that power the decentralized reconciliation mesh. The plurality of monitory policies may each comprise a mitigation measure directed to responding to the one or more anomalies that were detected in the inputted hashed data.

At step 232, anomaly detection and reconciliation mesh analysis engine 120 may generate a third user interface. The third user interface may be similar to the exemplary first user interface 300 generated by anomaly detection and reconciliation mesh analysis engine 120 at step 213 and discussed above with reference to FIG. 3A. That is, the third user interface may be directed to allowing one or more individuals associated with the enterprise organization associated with anomaly detection and reconciliation mesh analysis engine 120 to analyze both the detected anomalies and the monitory policies generated by the decentralized reconciliation mesh. Similar to the first user interface 300, a first section 310 of the third user interface may display data associated with the detected anomalies, such as data identifying the and/or the underlying data in which the anomalies were detected (for example, the hashed original trade metadata received from real-time trade processing and centralized reconciliation engines such as real-time trade processing and centralized reconciliation engine 110 and real-time trade processing and centralized reconciliation engine 130, tokenized trade metadata generated by anomaly detection and reconciliation mesh analysis engine 120 based on the original trade metadata, tokenized trade metadata digital DNA and/or hashed tokenized trade metadata digital DNA), and a second section 320 of the third user interface may display information associated with the plurality of monitory policies generated by the decentralized reconciliation mesh. In one example, anomaly detection and reconciliation mesh analysis engine 120 (or the decentralized reconciliation mesh) may have ranked the monitory policies based on one or more ranking parameters, and section 320 may display the monitory policies in the order in which they are ranked. Any of the displayed monitory policies may be selected using selection indicators 321a-321c.

Figure 2J:
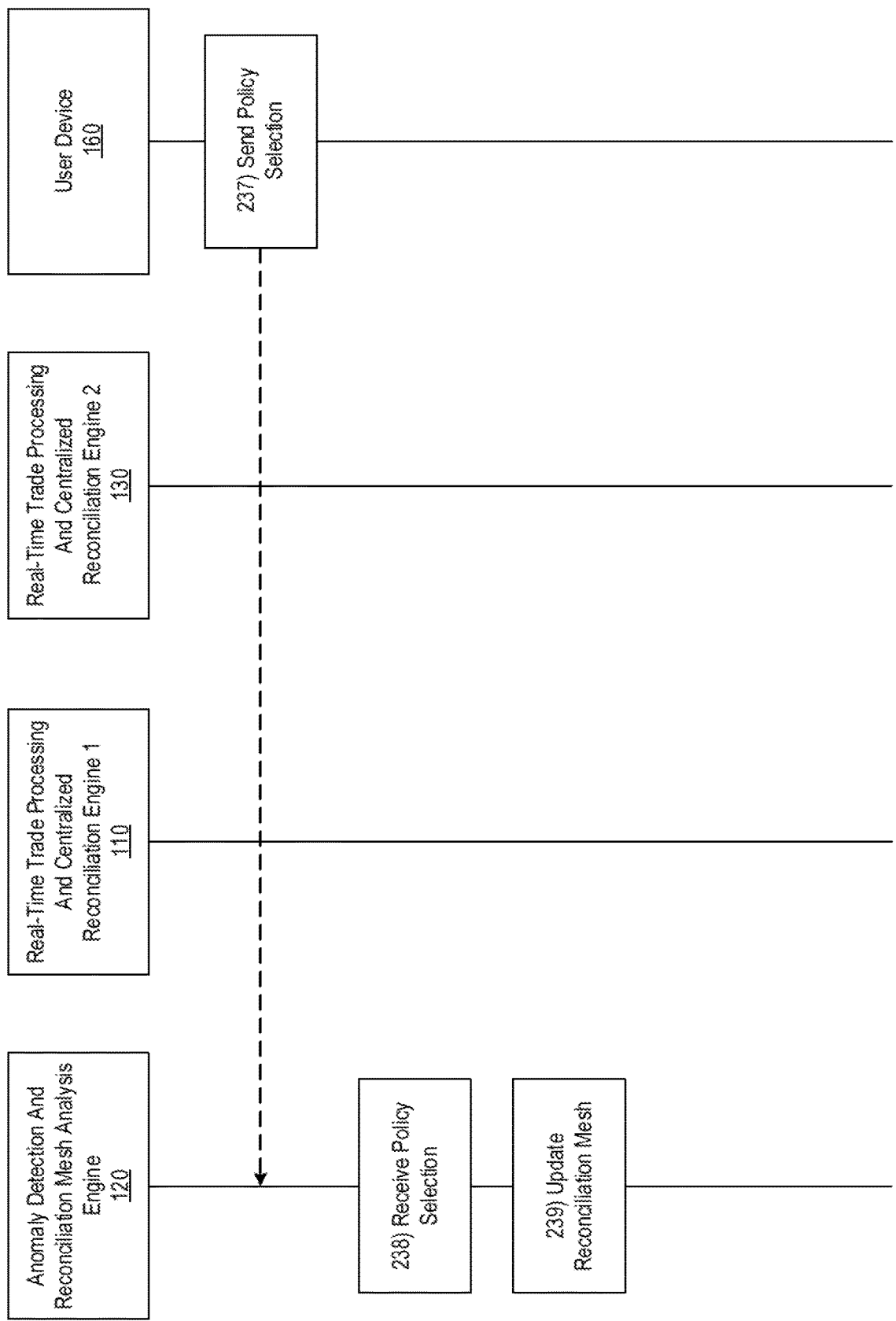

Referring to FIG. 2I, at step 233, anomaly detection and reconciliation mesh analysis engine 120 may send the third user interface generated at step 232 to user device 160. At step 234, user device 160 may receive the third user interface sent from anomaly detection and reconciliation mesh analysis engine 120 at step 233. The sending of the third user interface from anomaly detection and reconciliation mesh analysis engine 120 to user device 160 and/or the receiving of the third user interface by user device 160 from anomaly detection and reconciliation mesh analysis engine 120 may be configured to cause user device 160 to output the third user interface for display at a display device of user device 160. Accordingly, at step 235, user device 160 may output the third user interface for display at the display device of user device 160. At step 236, user device 160 may receive, via the third user interface, a selection of a second monitory policy. The second monitory policy may be a monitory policy that was displayed in section 320 of the third user interface. Referring to FIG. 2J, at step 237, user device 160 may send the selection of the second monitory policy to anomaly detection and reconciliation mesh analysis engine 120. At step 238, anomaly detection and reconciliation mesh analysis engine 120 may receive the selected second monitory policy from user device 160. At step 239, anomaly detection and reconciliation mesh analysis engine 120 may update the decentralized reconciliation mesh with the second monitory policy. Anomaly detection and reconciliation mesh analysis engine 120 may update the decentralized reconciliation mesh with the second monitory policy by creating, within the decentralized reconciliation mesh, an association between the anomalies that were inputted into the decentralized reconciliation mesh at step 229 and the selected first monitory policy which was received by anomaly detection and reconciliation mesh analysis engine 120 from user device 160 at step 238.

Figure 4:
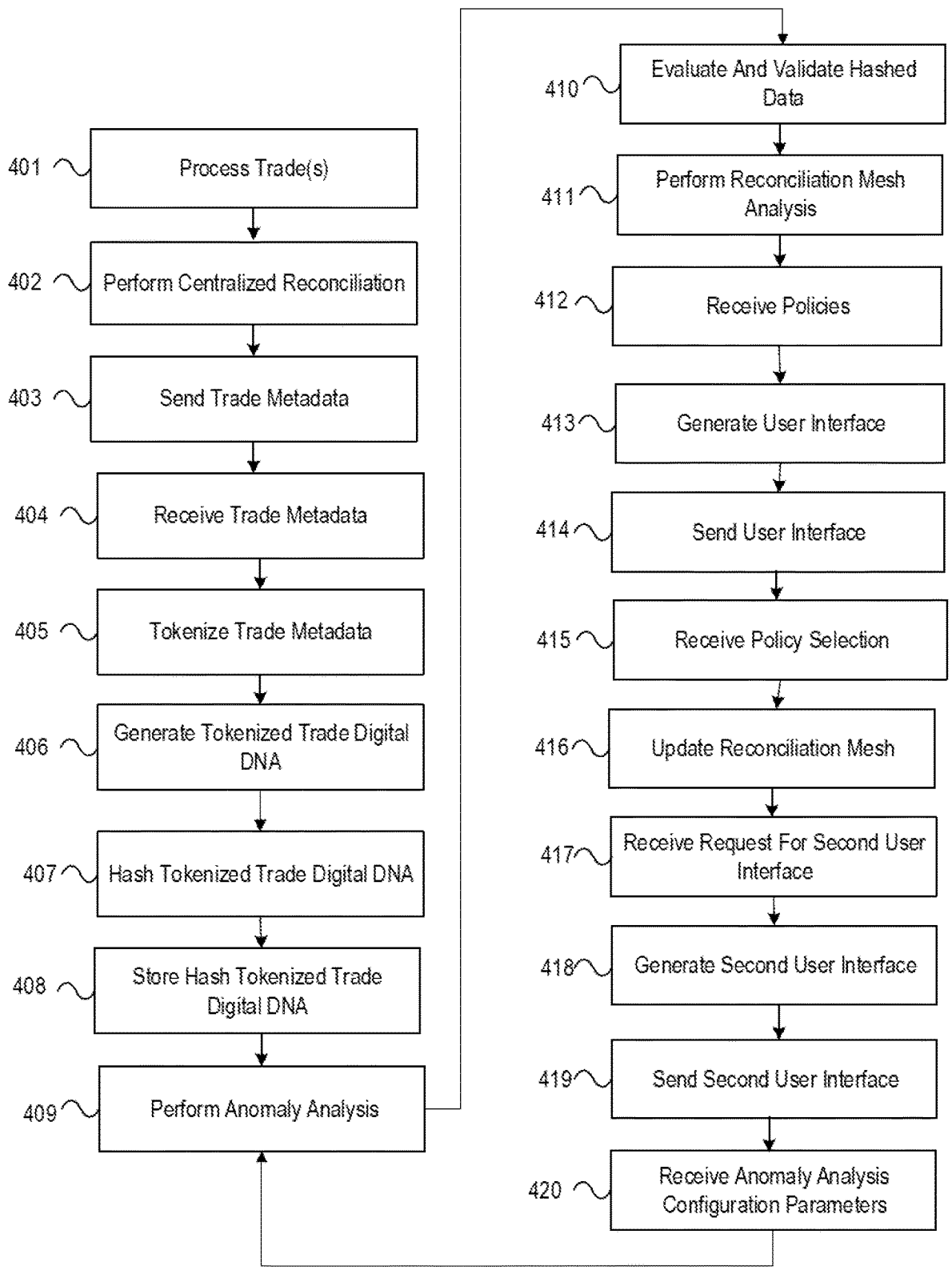
FIG. 4 depicts an illustrative method for implementing a computing system comprising a plurality of real-time trade processing and centralized reconciliation engines and an anomaly detection and reconciliation mesh analysis engine that collectively implement a dual-system reconciliation process in accordance with one or more example embodiments.

FIG. 4 depicts an illustrative method for implementing a computing system comprising a plurality of real-time trade processing and centralized reconciliation engines and an anomaly detection and reconciliation mesh analysis engine that collectively implement a dual-system reconciliation process in accordance with one or more example embodiments. Referring to FIG. 4, at step 401, a first real-time trade processing and centralized reconciliation engine and a second real-time trade processing and centralized reconciliation engine having at least one processor, a communication interface, and memory, may each process one or more trades from one or more trade system. At step 402, the first real-time trade processing and centralized reconciliation engine and the second real-time trade processing and centralized reconciliation engine may each perform centralized reconciliation of each of the one or more trades processed by the first real-time trade processing and centralized reconciliation engine and the second real-time trade processing and centralized reconciliation engine. At step 403, the first real-time trade processing and centralized reconciliation engine and the second real-time trade processing and centralized reconciliation engine may each send trade metadata to an anomaly detection and reconciliation mesh analysis engine. At step 404, the anomaly detection and reconciliation mesh analysis engine, having at least one processor, a communication interface, and memory, may receive the trade metadata from the first real-time trade processing and centralized reconciliation engine and the second real-time trade processing and centralized reconciliation engine. At step 405, the anomaly detection and reconciliation mesh analysis engine may tokenize the trade metadata received from the first real-time trade processing and centralized reconciliation engine and the second real-time trade processing and centralized reconciliation engine. At step 406, the anomaly detection and reconciliation mesh analysis engine may generate tokenized trade digital DNA. The anomaly detection and reconciliation mesh analysis engine may generate the tokenized trade digital DNA from the tokenized trade metadata and one or more trade system markers. At step 407, the anomaly detection and reconciliation mesh analysis engine may generate hashed tokenized trade digital DNA.

At step 408, the anomaly detection and reconciliation mesh analysis engine may store the hashed tokenized trade digital DNA. At step 409, the anomaly detection and reconciliation mesh analysis engine may perform anomaly analysis of the hashed data. At step 410, the anomaly detection and reconciliation mesh analysis engine may evaluate and validate the hashed data. At step 411, the anomaly detection and reconciliation mesh analysis engine may perform decentralized reconciliation mesh analysis of the hashed data using a reconciliation mesh. At step 412, the anomaly detection and reconciliation mesh analysis engine may receive one or more monitory policies from the reconciliation mesh.

At step 413, the anomaly detection and reconciliation mesh analysis engine may generate a first user interface. At step 414, the anomaly detection and reconciliation mesh analysis engine may send the first user interface to a user device. At step 415, the anomaly detection and reconciliation mesh analysis engine may receive a first monitory policy selection from the user device. At step 416, the anomaly detection and reconciliation mesh analysis engine may update the decentralized reconciliation mesh based on the first monitory policy selection. At step 417, the anomaly detection and reconciliation mesh analysis engine may receive a request for a second user interface.

At step 418, the anomaly detection and reconciliation mesh analysis engine may generate the second user interface. At step 419, the anomaly detection and reconciliation mesh analysis engine may send the second user interface to the user device. At step 420, the anomaly detection and reconciliation mesh analysis engine may receive one or more anomaly analysis configuration parameters. Subsequently, processing may return to step 409, where the anomaly detection and reconciliation mesh analysis engine may perform anomaly analysis using the one or more anomaly analysis configuration parameters and then proceed with performing steps 410-416 based on the results of the anomaly analysis.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing system comprising:
   a real-time trade processing and centralized reconciliation engine comprising:
   at least a first processor;
   a first communication interface communicatively coupled to the at least first processor; and
   first memory storing computer-readable instructions that, when executed by the at least first processor, causes the real-time trade processing and centralized reconciliation engine to:
   process a first trade by retrieving first trade metadata associated with the first trade from a first trade system associated with the first trade;
   determine whether there are any anomalies in the first trade metadata by performing a centralized reconciliation on the first trade metadata using historical trade data of the first trade system associated with the first trade and an anomaly history of the first trade system associated with the first trade; and
   responsive to determining that there are no anomalies in the first trade metadata, send the first trade metadata to an anomaly detection and reconciliation mesh analysis engine; and
   the anomaly detection and reconciliation mesh analysis engine, wherein the anomaly detection and reconciliation mesh analysis engine comprises:
   at least a second processor;
   a second communication interface communicatively coupled to the at least first processor; and
   second memory storing computer-readable instructions that, when executed by the at least second processor, causes the anomaly detection and reconciliation mesh analysis engine to:

receive the first trade metadata from the real-time trade processing and centralized reconciliation engine;

tokenize the first trade metadata to generate first tokenized trade metadata;

generate, from at least the first tokenized trade metadata, first tokenized trade digital DNA;

perform hashing on the first tokenized trade digital DNA to generate hashed data;

compare the hashed data to determine whether there are any anomalies within the hashed data; and responsive to determining that the hashed data comprises at least one anomaly, input the hashed data into a decentralized reconciliation mesh.

2. The computing system of claim 1, where the first trade is further associated with a second trade system.

3. The computing system of claim 2, wherein the centralized reconciliation further uses historical trade data of the second trade system associated with the first trade and an anomaly history of the second trade system associated with the first trade.

4. The computing system of claim 3, further comprising a second real-time trade processing and centralized reconciliation engine comprising:

at least a third processor;

a third communication interface communicatively coupled to the at least third processor; and third memory storing computer-readable instructions that, when executed by the at least third processor, causes the second real-time trade processing and centralized reconciliation engine to:

process a second trade by retrieving second trade metadata associated with the second trade;

determine whether there are any anomalies in the second trade metadata by performing a centralized reconciliation on the second trade metadata; and responsive to determining that there are no anomalies in the second trade metadata, send the second trade metadata to the anomaly detection and reconciliation mesh analysis engine.

5. The computing system of claim 4, the second memory storing computer-readable instructions that, when executed by the at least second processor, causes the anomaly detection and reconciliation mesh analysis engine to:

receive the second trade metadata from the second real-time trade processing and centralized reconciliation engine; and tokenize the second trade metadata to generate second tokenized trade metadata.

6. The computing system of claim 5, wherein the first tokenized trade digital DNA is further generated based on the second tokenized trade metadata that is associated with the second trade.

7. The computing system of claim 5, wherein:

the first trade is a same trade as the second trade, wherein the first tokenized trade metadata and the second tokenized trade metadata are part of a first strand of digital data within the first tokenized trade digital DNA, and wherein the first strand of digital data within the first tokenized trade digital DNA is generated by algorithmically combining the first tokenized trade metadata, the second tokenized trade metadata, and one or more markers associated with the first trade system.

8. The computing system of claim 7, wherein the performing the hashing on the first tokenized trade digital DNA comprises hashing the first strand of digital data.

9. The computing system of claim 7, wherein the performing the hashing on the first tokenized trade digital DNA comprises hashing the first tokenized trade metadata and the second tokenized trade metadata.

10. The computing system of claim 1, wherein the real-time trade processing and centralized reconciliation engine processes the first trade in real-time.

11. A method comprising:

at a real-time trade processing and centralized reconciliation engine comprising at least a first processor, a first communication interface, and first memory:

processing a first trade by retrieving first trade metadata associated with the first trade from a first trade system associated with the first trade;

determining whether there are any anomalies in the first trade metadata by performing a centralized reconciliation on the first trade metadata using historical trade data of the first trade system associated with the first trade and an anomaly history of the first trade system associated with the first trade; and responsive to determining that there are no anomalies in the first trade metadata, sending the first trade metadata to an anomaly detection and reconciliation mesh analysis engine; and at the anomaly detection and reconciliation mesh analysis engine comprising at least a second processor, a second communication interface, and a second memory:

receiving the first trade metadata from the real-time trade processing and centralized reconciliation engine;

tokenizing the first trade metadata to generate first tokenized trade metadata;

generating, from at least the first tokenized trade metadata, first tokenized trade digital DNA;

performing hashing on the first tokenized trade digital DNA to generate hashed data;

comparing the hashed data to determine whether there are any anomalies within the hashed data; and responsive to determining that the hashed data comprises at least one anomaly, input the hashed data into a decentralized reconciliation mesh.

12. The method of claim 11, where the first trade is further associated with a second trade system.

13. The method of claim 12 wherein the centralized reconciliation further uses historical trade data of the second trade system associated with the first trade and an anomaly history of the second trade system associated with the first trade.

14. The method of claim 13, further comprising, at a second real-time trade processing and centralized reconciliation engine comprising at least a third processor, a third communication interface, and a third memory:

processing a second trade by retrieving second trade metadata associated with the second trade;

determining whether there are any anomalies in the second trade metadata by performing a centralized reconciliation on the second trade metadata; and responsive to determining that there are no anomalies in the second trade metadata, sending the second trade metadata to the anomaly detection and reconciliation mesh analysis engine.

15. The method of claim 14, further comprising, at the anomaly detection and reconciliation mesh analysis engine:

receiving the second trade metadata from the second real-time trade processing and centralized reconciliation engine; and tokenizing the second trade metadata to generate second tokenized trade metadata.

16. The method of claim 15, wherein the first tokenized trade digital DNA is further generated based on the second tokenized trade metadata that is associated with the second trade.

17. The method of claim 15, wherein:
the first trade is the same as the second trade,
wherein the first tokenized trade metadata and the second tokenized trade metadata are part of a first strand of digital data within the first tokenized trade digital DNA;
wherein the first strand of digital data within the first tokenized trade digital DNA is generated by algorithmically combining the first tokenized trade metadata, the second tokenized trade metadata, and one or more markers associated with the first trade system.

18. The method of claim 17, wherein the performing the hashing on the first tokenized trade digital DNA comprises hashing the first strand of digital data.

19. The method of claim 17, wherein the performing the hashing on the first tokenized trade digital DNA comprises hashing the first tokenized trade metadata and the second tokenized trade metadata.

20. A plurality of non-transitory computer-readable media comprising:
first non-transitory computer-readable media storing instructions that, when executed by a real-time trade processing and centralized reconciliation engine comprising at least a first processor, a first communication interface, and first memory, cause the real-time trade processing and centralized reconciliation engine to:
process a first trade by retrieving first trade metadata associated with the first trade from a first trade system associated with the first trade;
determine whether there are any anomalies in the first trade metadata by performing a centralized reconciliation on the first trade metadata using historical trade data of the first trade system associated with the first trade and an anomaly history of the first trade system associated with the first trade; and
responsive to determining that there are no anomalies in the first trade metadata, send the first trade metadata to an anomaly detection and reconciliation mesh analysis engine; and
second non-transitory computer-readable media storing instructions that, when executed by the anomaly detection and reconciliation mesh analysis engine comprising at least a second processor, a second communication interface, and a second memory, cause the anomaly detection and reconciliation mesh analysis engine to:
receive the first trade metadata from the real-time trade processing and centralized reconciliation engine;
tokenize the first trade metadata to generate first tokenized trade metadata;
generate, from at least the first tokenized trade metadata, first tokenized trade digital DNA;
perform hashing on the first tokenized trade digital DNA to generate hashed data;
compare the hashed data to determine whether there are any anomalies within the hashed data; and
responsive to determining that the hashed data comprises at least one anomaly, input the hashed data into a decentralized reconciliation mesh.

* * * * *